United States Patent
Bolcer et al.

(10) Patent No.: US 11,698,909 B2
(45) Date of Patent: *Jul. 11, 2023

(54) BULLETIN BOARD DATA MAPPING AND PRESENTATION

(71) Applicant: Bitvore Corp., Los Angeles, CA (US)

(72) Inventors: Greg Bolcer, Yorba Linda, CA (US); John Petrocik, Irvine, CA (US); Alan Chaney, Simi Valley, CA (US); Nirmisha Bollampalli, Irvine, CA (US); Andrey Mogilev, Novosibirsk (RU); Kevin Watters, Boston, MA (US)

(73) Assignee: Bitvore Corp., Los Angeles, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/315,626

(22) Filed: May 10, 2021

(65) Prior Publication Data

US 2021/0263941 A1    Aug. 26, 2021

Related U.S. Application Data

(63) Continuation of application No. 16/573,320, filed on Sep. 17, 2019, now Pat. No. 11,048,710, which is a
(Continued)

(51) Int. Cl.
*G06F 16/00* (2019.01)
*G06F 16/2457* (2019.01)
*G06F 16/9535* (2019.01)
*G06Q 10/101* (2023.01)
(Continued)

(52) U.S. Cl.
CPC ...... *G06F 16/24578* (2019.01); *G06F 16/248* (2019.01); *G06F 16/9535* (2019.01);
(Continued)

(58) Field of Classification Search
None
See application file for complete search history.

(56) References Cited

U.S. PATENT DOCUMENTS

| 10,423,628 B2* | 9/2019 | Bolcer | ............ G06V 30/416 |
| 11,048,710 B2* | 6/2021 | Bolcer | ............ G06F 16/248 |

(Continued)

*Primary Examiner* — Bai D Vu
(74) *Attorney, Agent, or Firm* — McAndrews, Held & Malloy, Ltd.

(57) ABSTRACT

A computer-implemented method performed at a server system having one or more processors and memory, the method comprising receiving a set of curated documents comprising one or more documents identified as being relevant to a sector, analyzing the set of curated documents to determine one or more words and a count of each of the one or more words for all documents of the curated set of documents, further analyzing the set of curated documents, by analyzing one or more n-grams based on the one or more words, determining a first score based on a term frequency and a global document frequency of each of the one or more words of each of the one or more n-grams, determining a document vector based on averages of the first score, where the document vector comprises a perfect document for the sector, and storing the document vector in the data store.

18 Claims, 31 Drawing Sheets

Related U.S. Application Data continuation of application No. 14/855,290, filed on Sep. 15, 2015, now Pat. No. 10,423,628, which is a continuation-in-part of application No. 14/678,762, filed on Apr. 3, 2015, which is a continuation of application No. 13/214,053, filed on Aug. 19, 2011, now Pat. No. 9,015,244.

(60) Provisional application No. 61/375,414, filed on Aug. 20, 2010.

(51) Int. Cl.
  *G06Q 10/107* (2023.01)
  *G06Q 50/00* (2012.01)
  *G06F 16/248* (2019.01)
  *G06V 30/416* (2022.01)
  *H04L 51/216* (2022.01)

(52) U.S. Cl.
  CPC ......... *G06Q 10/101* (2013.01); *G06Q 10/107* (2013.01); *G06Q 50/01* (2013.01); *G06V 30/416* (2022.01); *H04L 51/216* (2022.05)

(56) References Cited

U.S. PATENT DOCUMENTS

| | | | |
|---|---|---|---|
| 2002/0156763 A1* | 10/2002 | Marchisio | G06F 40/216 |
| 2004/0019601 A1* | 1/2004 | Gates | G06F 16/355 |
| | | | 707/999.102 |
| 2012/0330946 A1* | 12/2012 | Arredondo | G06F 16/24575 |
| | | | 707/E17.014 |

\* cited by examiner

ALERT PREFERENCES:

- Alert trigger automatically makes User a Key Participant
- Currency
- Geographic Location
- Sentiment
- Advanced Search Query
- Notify when specific user is online Return to main page

```
 0    2    4    6    8    10   12   14   16   18
``` dare777  Straight kicks to the Knee    05-20-2010, 08:43 AM
    joeyP  *It's a very whimp ass move...*    05-20-2010, 10:37 AM
    IceCold48  *yes they should be banned...*    05-20-2010, 12:54 PM
    dare777  *2 replies on a topic about a...*    05-20-2010, 02:38 PM
    trustkill  *I was wondering the same...*    05-20-2010, 02:47 PM
    Jaydo06  *I'm still surprised that this...*    05-21-2010, 01:46 PM
        likebutta  *I agree. I don't see the...*    05-21-2010, 02:56 PM
            Jaydo06  *It's just plain too dangerous...*    05-21-2010, 02:43 PM
    AmmsAcad  *I think it shouldnt be used...*    05-23-2010, 03:12 PM
    stpierrecanada  *Honestly I don't see anything...*    05-23-2010, 07:51 PM
        AmmsAcad  *I guess what I really mean is...*    05-24-2010, 07:20 PM
        Jaydo06  *Only difference is that you...*    05-27-2010, 01:29 PM
    Schlinks  *I never really like seeing...*    05-24-2010, 03:32 AM
    Frasedog  *I personally think they...*    05-24-2010, 01:00 PM
        mattc25  *...great post. My thoughts...*    05-24-2010, 08:53 PM
    mma#1fan  *don't plant your lead leg and...*    05-25-2010, 09:00 AM
        dbader08  *I think they should be...*    05-25-2010, 07:20 PM
            Schlinks  *I don't think the reasoning...*    05-26-2010, 01:00 AM
            dare777  *I hear what you are saying...*    05-26-2010, 09:48 AM
    dare777  *I am on the fence now. I have...*    05-26-2010, 09:45 AM
    beau420  *If you watch K-1 they always...*    05-27-2010, 02:49 PM

Figure 8

1812 — Title: Aug. 21: Carriage horses, Times Square and immigration  1810

1814 — [Repetitive] [Opinion] [Junk] [Forward Looking]

1816
Published_Data Thursday, August 20, 2013 11:56 PM recordType WEBCONTENT ???_sector_education_score 0.693 tigof_sector Ufgdf_sector_WebTracker_score 0.263 tfgof_sector_score_debug Education=0.6525279954475647, Health=0.45392371664389874

Title: Aug. 21: Carriage horses, Times Square and immigration

---

1822 — Title: McPherson teacher first to apply for waiver  1820

1824 — [Repetitive] [Opinion] [Junk] [Forward Looking]

1826
Published_Data Thursday, August 20, 2013 11:56 PM recordType WEBCONTENT ???_sector_education_score 0.716 tigof_sector Ufgdf_sector_WebTracker_score 0.185 tfgof_sector_score_debug Education=0.7161560128790175, Health=0.11303831981406576

Title: McPherson teacher first to apply for waiver

---

1832 — Title: Brewster fail town meeting set for September 2 | CapeCodToday.com  1830

1834 — [Repetitive] [Opinion] [Junk] [Forward Looking]

1836
Published_Data Thursday, August 20, 2013 11:56 PM recordType WEBCONTENT ???_sector_education_score 0.551 tigof_sector Ufgdf_sector_WebTracker_score 0.272 tfgof_sector_score_debug Education=0.5514464481287376, Health=0.07216700685152429

Title: Brewster fail town meeting set for September 2 | CapeCodToday.com

FIGURE 18

BULLETIN BOARD DATA MAPPING AND PRESENTATION

RELATED APPLICATIONS

This application is a continuation of U.S. patent application Ser. No. 16/573,320 filed on Sep. 17, 2019, which is a continuation of U.S. patent application Ser. No. 14/855,290 filed on Sep. 15, 2015, which is a continuation-in-part of U.S. patent application Ser. No. 14/678,762 filed on Apr. 3, 2015, which is a Continuation of U.S. patent application Ser. No. 13/214,053 filed on Aug. 19, 2011 (U.S. Pat. No. 9,015,244), which claims priority to U.S. Provisional Patent Application No. 61/375,414 filed Aug. 20, 2010. Each of these applications are incorporated by reference herein in their entirety.

BACKGROUND OF THE SYSTEM

Electronic communication has become an indispensable business and personal tool. Applications such as email, instant messaging, SMS texting, Twitter, social networking sites, Bulletin Boards, Collaboration Software, and the like have become ubiquitous and are used extensively in lieu of, or in combination with, more conventional communications methods such as postal mail, telephone communication, and in person meetings.

As electronic communication has supplemented and replaced prior communication techniques its importance as evidence in transactions has grown. Particularly in litigation, due in part to the impact of Sarbanes-Oxley and other corporate governance requirements, the preservation and production of email is required in every jurisdiction.

The Federal Rules of Civil Procedure have been expanded to cover electronically stored information (ESI) including emails and other types of electronic communication. This type of information must be preserved and produced in a controversy as well as in the normal course of corporate governance. A difficulty in producing electronic communications is the need to produce all the electronic communications required and only the electronic communications that are required of a party to produce. Failure to produce all requested electronic communications can result in potential loss of rights and/or penalties from governing bodies such as the SEC, Producing more electronic communications than are required can breach confidentiality and put a litigant or company in the position of revealing data that would otherwise have remained confidential.

One type of electronic communication system in use are bulletin board systems (BBS). A BBS is a computer program that allows users and guests (Collectively "posters") to log in and participate in a number of operations, including the posting of messages related to some particular subject. Often a BBS is a special interest destination that deals with a particular subject. For example, there are BBS's for nearly all makes and models of vehicles, audio systems, consumer products, movies, television shows, performers, musicians, and the like. A BBS may be ran by an individual or group, or even by a corporate sponsor or other commercial enterprise.

A BBS poster may be a registered users or a guest. Often there are tiers of users, with guests having the fewest privileges, posters who register for free having more privileges, and posters who elect to pay for membership (if offered) enjoying the most privileges.

Posters typically register under an avatar or pseudonym, although such is not typically required. However, the anonymity of a pseudonym seems to be desired by most registrants. Typically, the registrant associates their account with a particular email address, which itself may be pseudonymous.

A BBS may define a hierarchy of folders that define topics and areas of discussion. Individual messages and communications within a folder or topic are referred to herein as "postings". A group of related postings is referred to as a "thread". In some cases, a poster can initiate a new folder where all replies to the initial posting are found within that folder. In some cases, new threads can only be created at certain points in the folder hierarchy, and at the lowest level, for example, only replies can be posted and no new threads can be created.

A BBS may have icons or buttons such as "New Topic" or "New Thread" which will create a new discrete folder or thread, within a thread, the poster may only be presented with "Post Reply". In some instances, only an administrator or moderator can create a new thread or topic.

A BBS is often organized in one of two ways. One way is a "linear mode" BBS where there is no threading and sub-threading. The other way is a "threaded mode" BBS where there are threads and one or more hierarchical levels of sub-threads.

In the current art, there is not a good solution for the culling, sorting, inspection, and analysis of postings and the relationship among Posters.

BRIEF SUMMARY OF THE SYSTEM

The system provides a method and apparatus for sorting and displaying information from a BBS. The system provides a method of sorting and presenting messages from a BBS in a way so that the content of postings can be analysed and tracked, possible and/or existing relationship(s) between posters can be deduced, and the relationship in message threads can be easily observed and related messages can be identified. The system provides a way to view messages, map message threads, and view possible and/or existing relationships between poster in two and three dimensions so that the content of messages can be easily reviewed and the relationship between messages can be seen and followed. The system allows a user to enter into an message thread at any point and to then produce a visualization of the related threads and messages associated with each individual message. A unique tool allows the navigation of BBS databases with ease. The system provides interfaces for a linear BBS, a threaded BBS, or even a hybrid BBS that is some combination of linear and threaded.

BRIEF DESCRIPTION OF THE DRAWINGS

FIGS. 1B-1K are magnified portions of FIG. 1A.

FIG. 2 is an example of the sort by feature of an embodiment of the system.

FIG. 5 is an example of the alert preferences feature of an embodiment of the system.

FIG. 6 is an example of options provided by right-clicking on a message.

FIG. 8 is an example of threaded bulletin board messages.

FIG. 18 illustrates an example list of relevant documents.

DETAILED DESCRIPTION OF EXAMPLE EMBODIMENTS

The system allows the mapping, collection, filtering, and display of messages from a data source such as a BBS or any other type of message system, including from social media networks, twitter, user groups, and the like. The following example relates to embodiments using one or BBS environments, but the system has equal application to other messaging environments.

Figure 11:
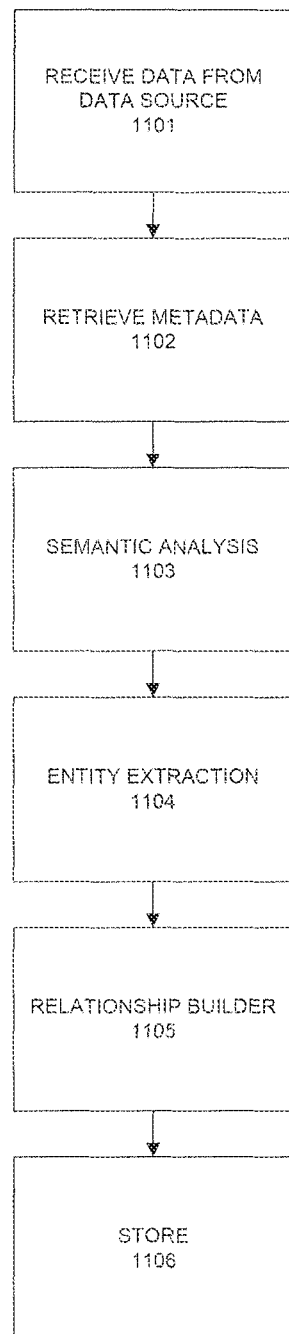
FIG. 11 is a flow diagram illustrating an embodiment of the operation of the system.

As noted above, a BBS can be configured in linear, non-linear, or hybrid structures. In operation, the system has access to a database of the messages at one or more bulletin boards. The system downloads and sorts the messages, collects meta data, and normalizes the data for use by the system. An example of the operation of an embodiment of the system is illustrated in the flow diagram of FIG. 11.

At step 1101 the system receives data from a data source. The data source could be a linear or nonlinear BBS, text messaging system, social media network, email, and/or other communication systems. At step 1102 the system retrieves any metadata associated with the source data. This can include sender, recipient, date, attachment information, and other metadata associated with each communication.

At step 1103 the system performs a semantic analysis on the data to provide more filtering information and to aid in identifying related messages. This can include attempting to identify related subject lines, copied message data in replies and forwards, and other information. The semantic analysis also aids in building an index into the data.

At step 1104 the system performs an entity extraction to identify senders and recipients and to associate those parties with any other accounts that may be pseudonyms of the party. This may be accomplished by IP address matching, semantic analysis, known aliases, or data from other sources, such as social network pages.

At step 1105 the system builds the relationships between the messages so that related messages can be more easily identified. The system includes its own metadata establishing relationships between participants and messages so that effective sorting, filtering, and querying can be accomplished. Finally, at step 1106, the system can store the normalized and reconfigured data, as well as the original source data, in a local data store for future access. In one embodiment, the storage step includes de-duplicating the messages to remove duplicates.

Figure 12:
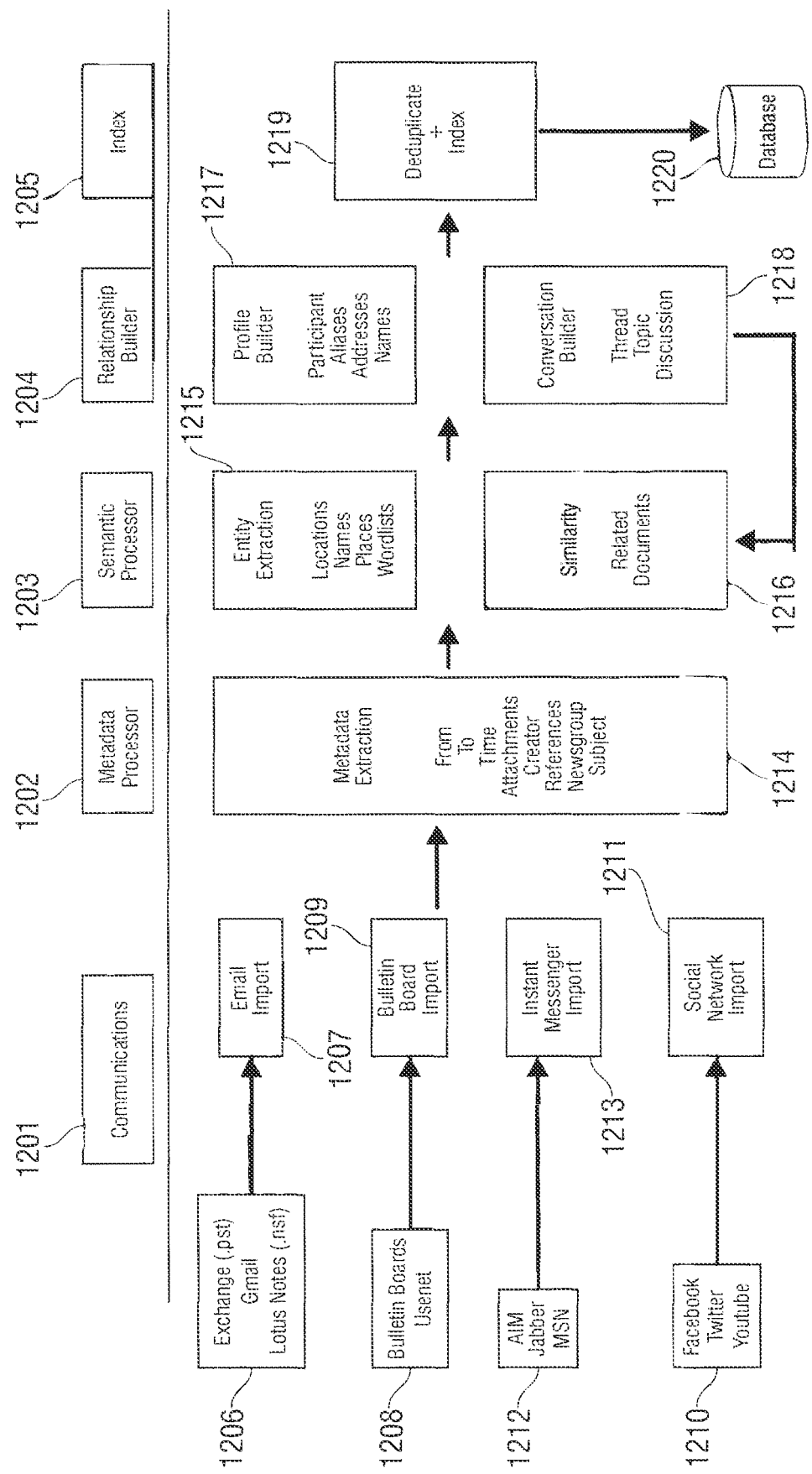
FIG. 12 is a block diagram illustrating an embodiment of the system.

An example of a hardware embodiment for sorting messages from a plurality of sources is illustrated in FIG. 12, The system operates in a plurality of stages. Stage 1201 is the communications stage. Stage 1202 is a metadata processing stage and is followed by a semantic processing stage 1203. The system includes a relationship building stage 1204 and indexing stage 1205.

The communication stage 1201 is where raw data is collected for importation to the rest of the system. The communication stage may take data from a plurality of sources, such as email 1206 through email importer 1207, BBS information 1208 via bulletin board importer 1209, social media data 1210 via social media importer 1211, and message data 1212 through instant messenger importer 1213.

Email data 1206 may be from any of one or more email system and may be in formats such as .pst files, Gmail files, .nsf (Lotus Notes) files, and the like. The email is imported with any attachments that may be associated with the emails. Bulletin board data 1208 may be messages or postings from web based bulletin boards and may come from linear or threaded (and sub-threaded) BBS sources (e.g. usenet) using bulletin board engines such as, for example, vBulletin. Bulletin board messages or postings are imported with any attachments or imbedded media such as video clips, photos, links, audio clips.

Social media data 1210 may include Twitter postings, Facebook wall postings or any other message based communications on social media, such as comments to videos or blogs and associated comments. Social Media messages or postings are imported with any attachments or imbedded media such as video clips, photos, audio clips, links, etc.

Messenger data 1212 includes AIM, SMS, Jabber, MSN, Blackberry Messenger, or any other instant message systems. Messenger messages are imported with any attachments or imbedded media such as video clips, photos, audio clips, links, etc.

Communications from each of these sources may be processed as a batch, or in a continuous manner as data arrives from each source, such as live monitoring of communications. Communications may also arrive multiple times or out-of-order, as they are placed in order and de-duplicated by the indexing engine 1219.

The semantic processing stage 1203 comprises an entity extractor 1215 and a similarity engine 1216. The entity extractor 1215 determines locations, names, places and other noun-phrase concepts which may be optionally guided by a user defined wordlist, related to each message or communication. The similarity engine 1216 uses the concepts identified by the entity extractor to identify related documents. This process conducts a search for other documents that have locations, names, places, or other noun-phrase concepts similar to the document being ingested. If the number of matching concepts exceeds a threshold the documents will be identified as similar, for use in later processing steps.

The relationship builder stage 1204 includes a profile builder 1217 and a conversation builder 1218. The profile builder 1217 identifies participants and any aliases, addresses, names, related accounts or user names, and other identifying information to identify a participant as well as possible regardless of the account that is being used. The conversation builder 1218 analyzes documents to determine if they are part of a new or existing communications thread. The conversation builder uses the output of the similarity engine 1216 and the techniques described in 86-106. This process incorporates a feedback loop so that each new document added to a thread helps to identify additional candidate documents. The conversation builder 1218 is helpful when responding to discovery requests by allowing appropriate responses to be identified even if the communications do not share a common subject line, thread, or topic.

The indexing stage 1205 includes an indexing engine 1219 to eliminate duplicates and to annotate and index each message. The indexed and processed communications and messages are stored in database 1220 for later retrieval and display, Linear BBS As noted above, a linear BBS presents messages in order of posting with no fixed relationship between one message and another. A user might discern a relationship by the subject line used by subsequent posters, but such replies and/or related messages may be separated by a plurality of other unrelated messages.

Figure 1A:
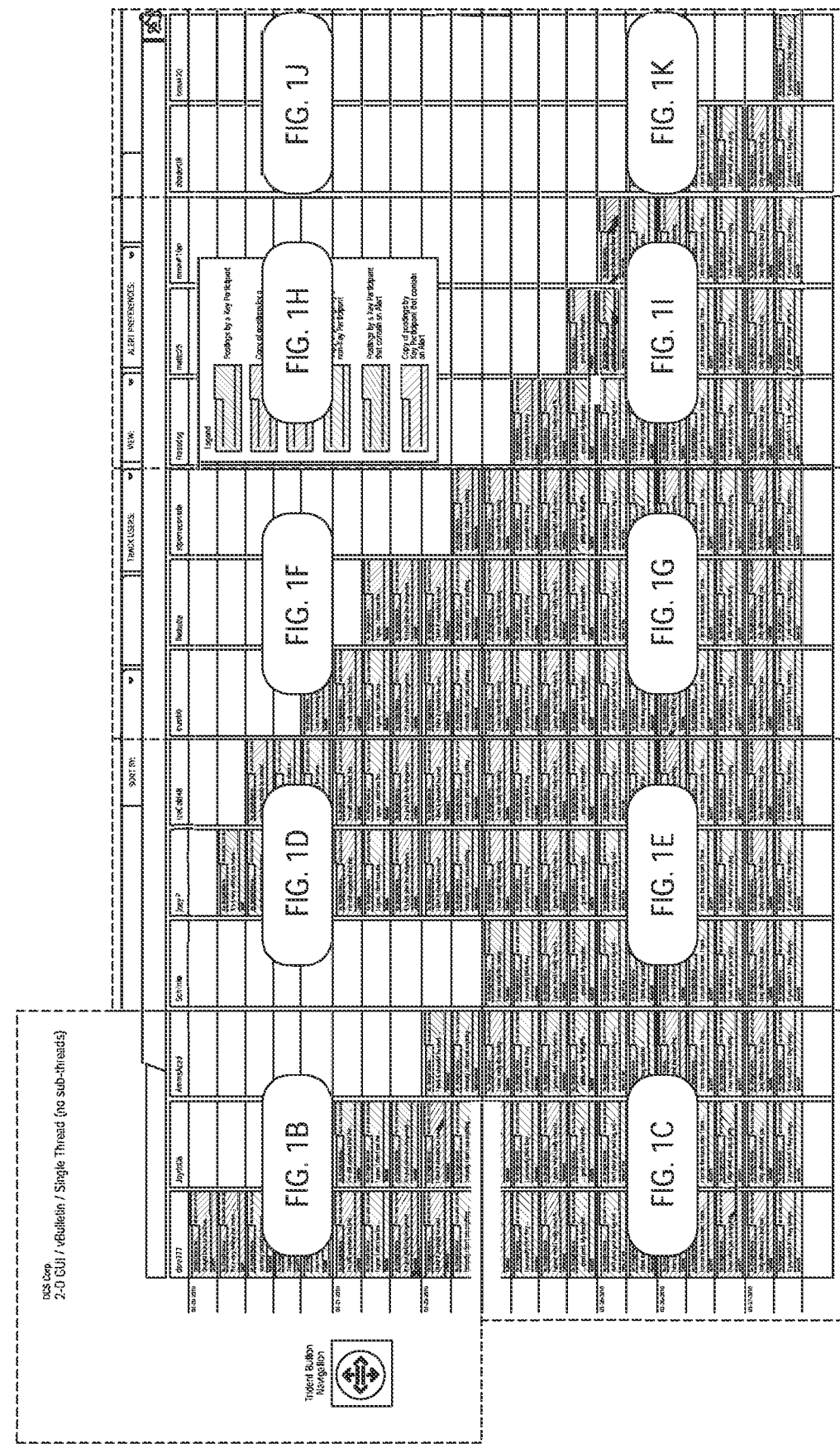
FIG. 1A is an example of a sorted presentation of messages from a linear BBS.
Figure 1B:
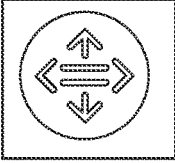
Figure 1C:
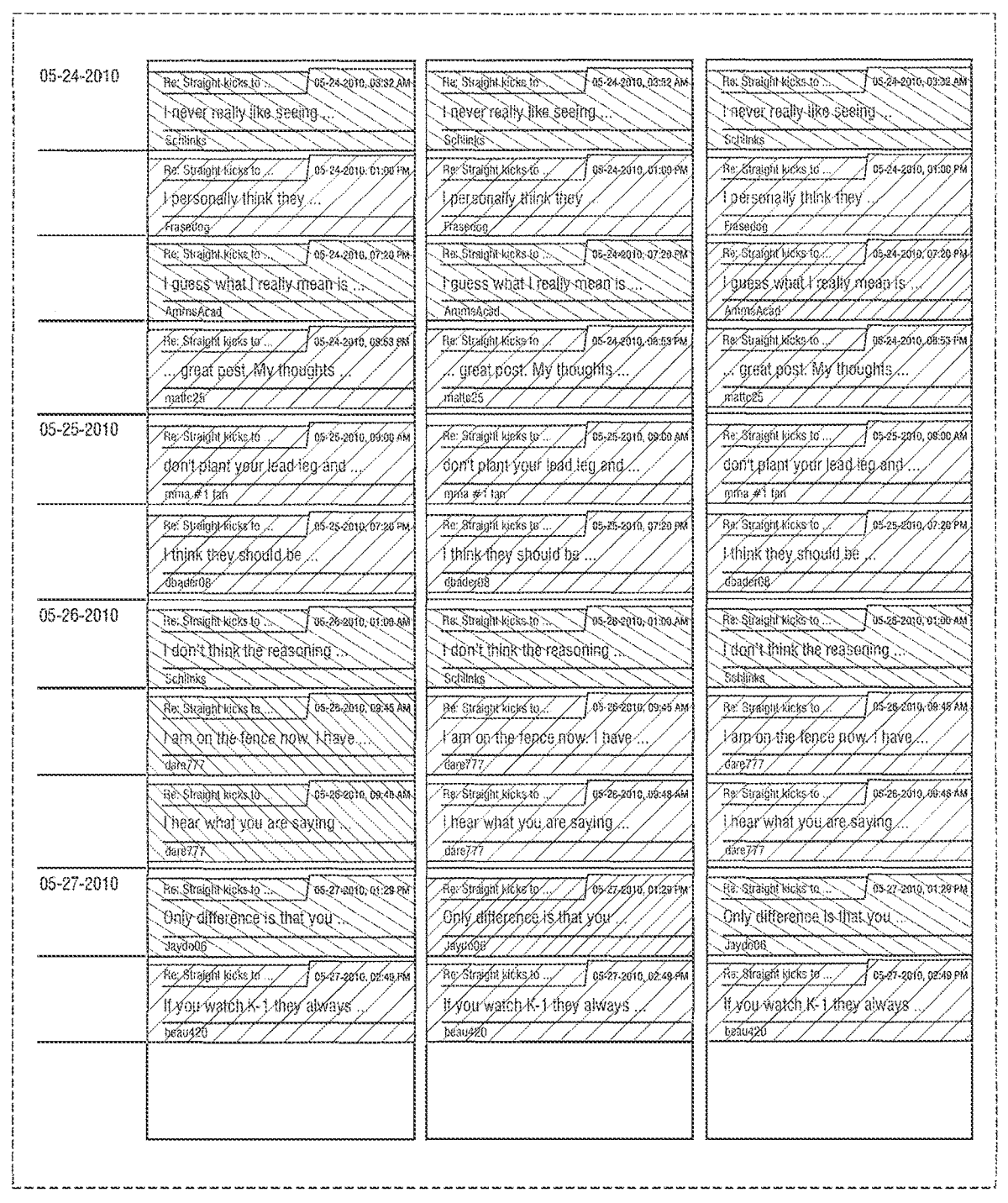
Figure 1D:
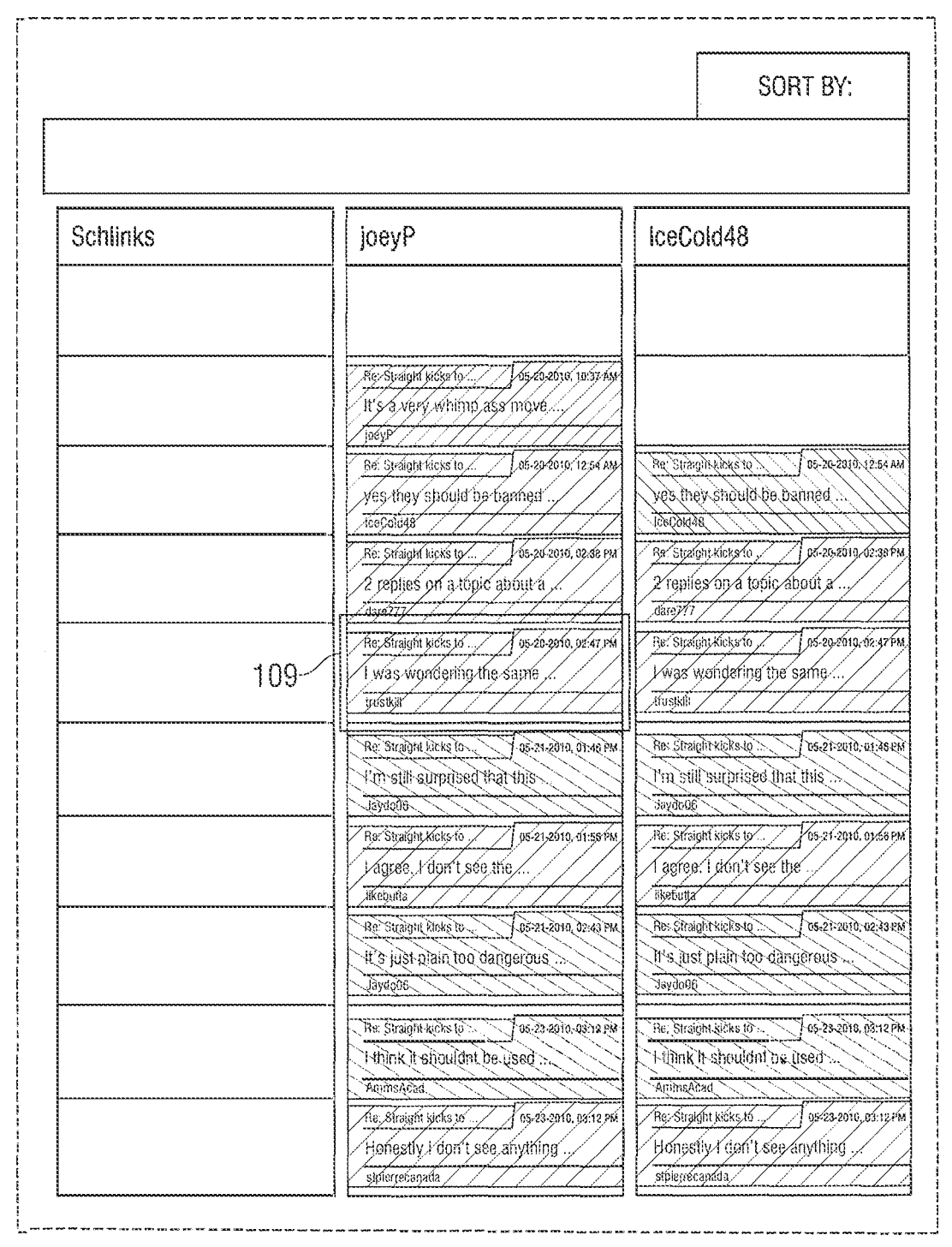
Figure 1E:
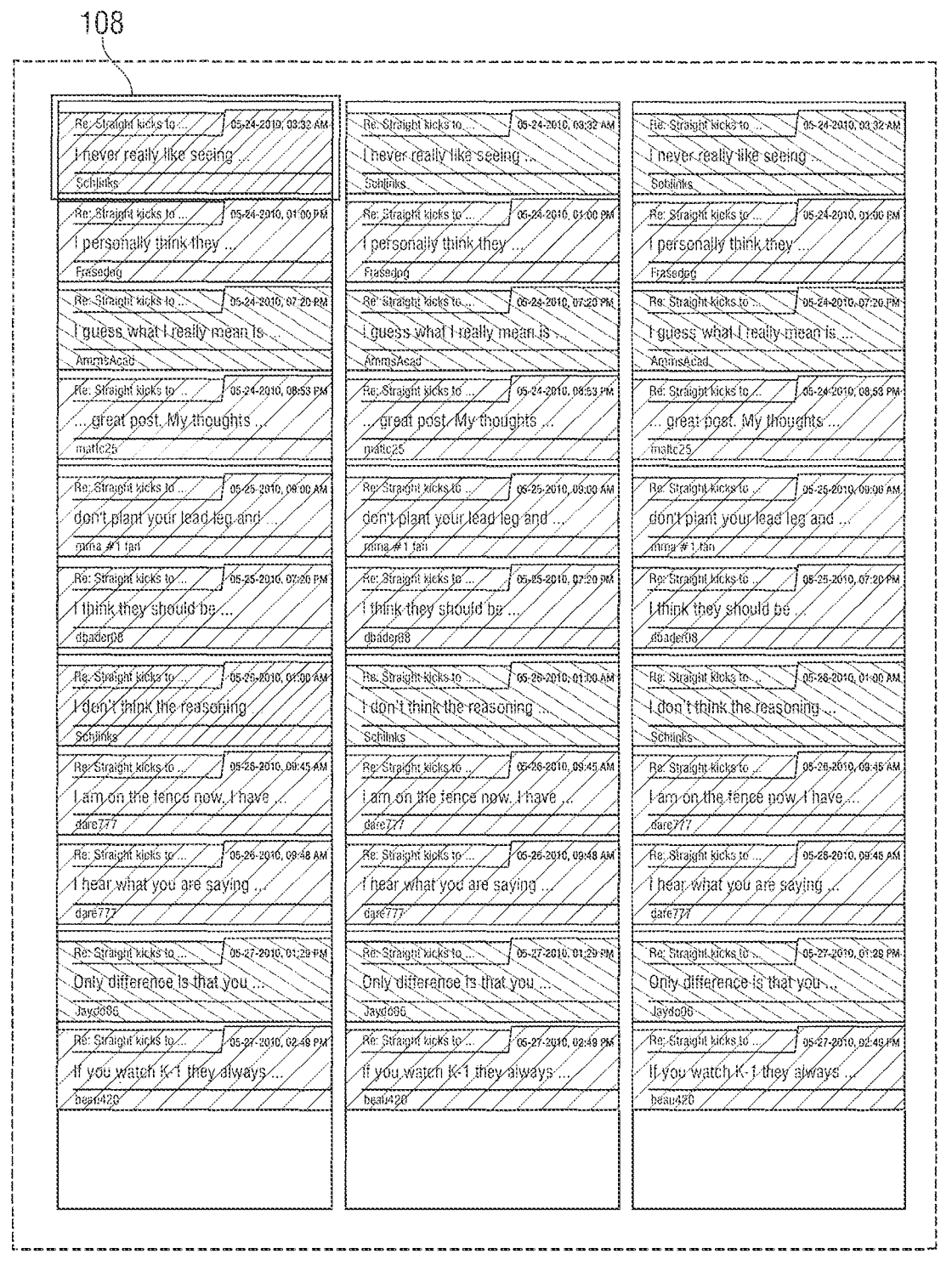
Figure 1F:
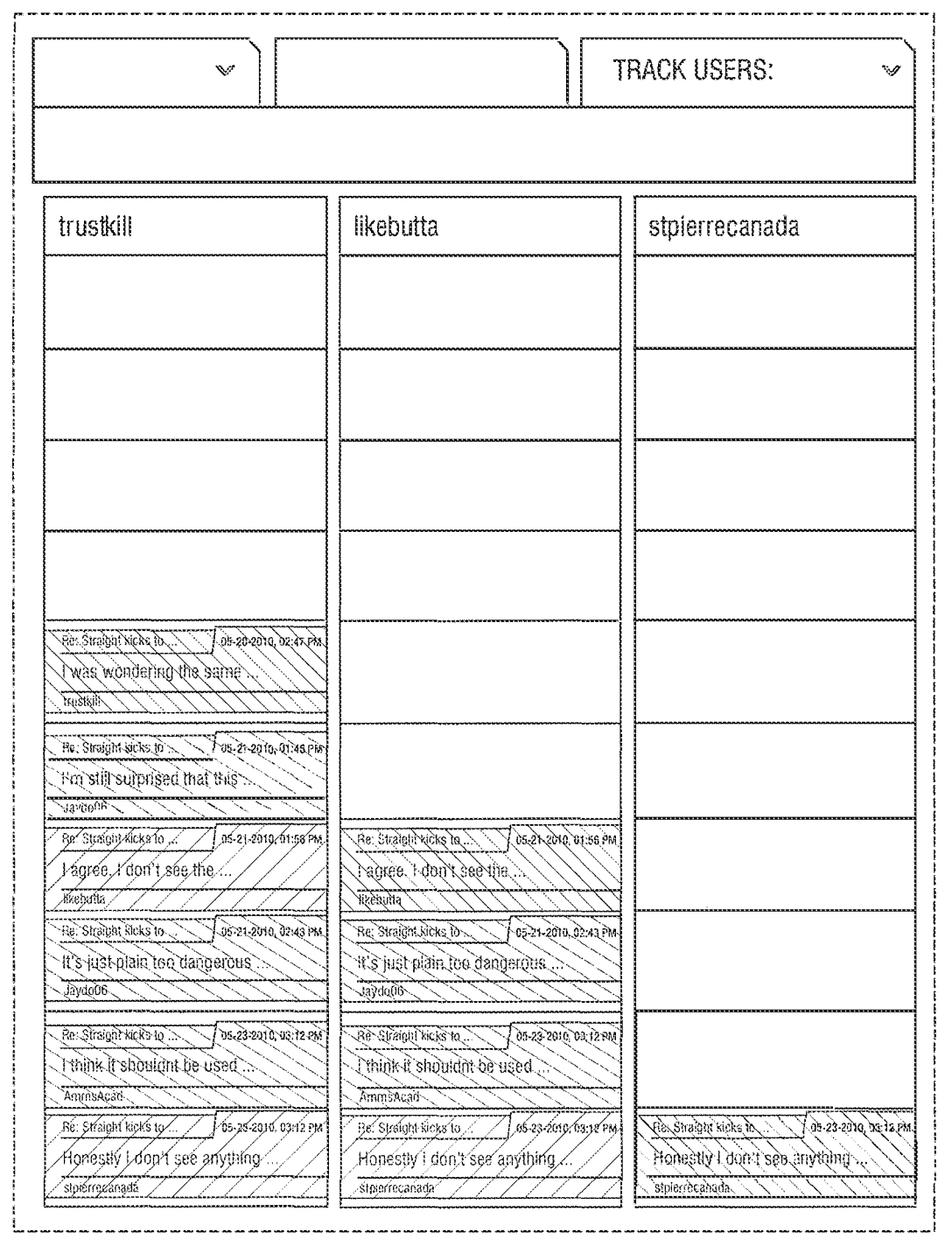
Figure 1H:
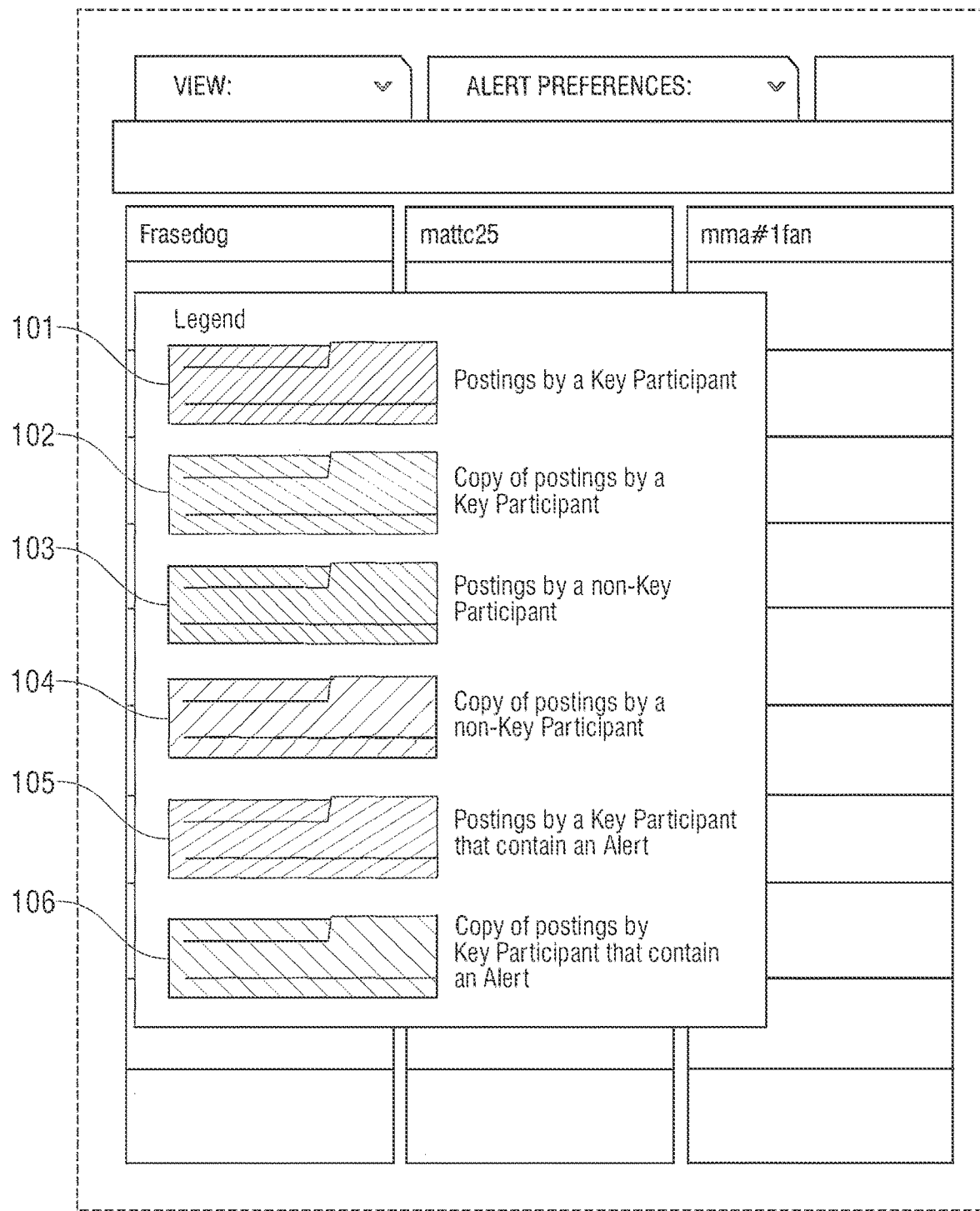
Figure 1I:
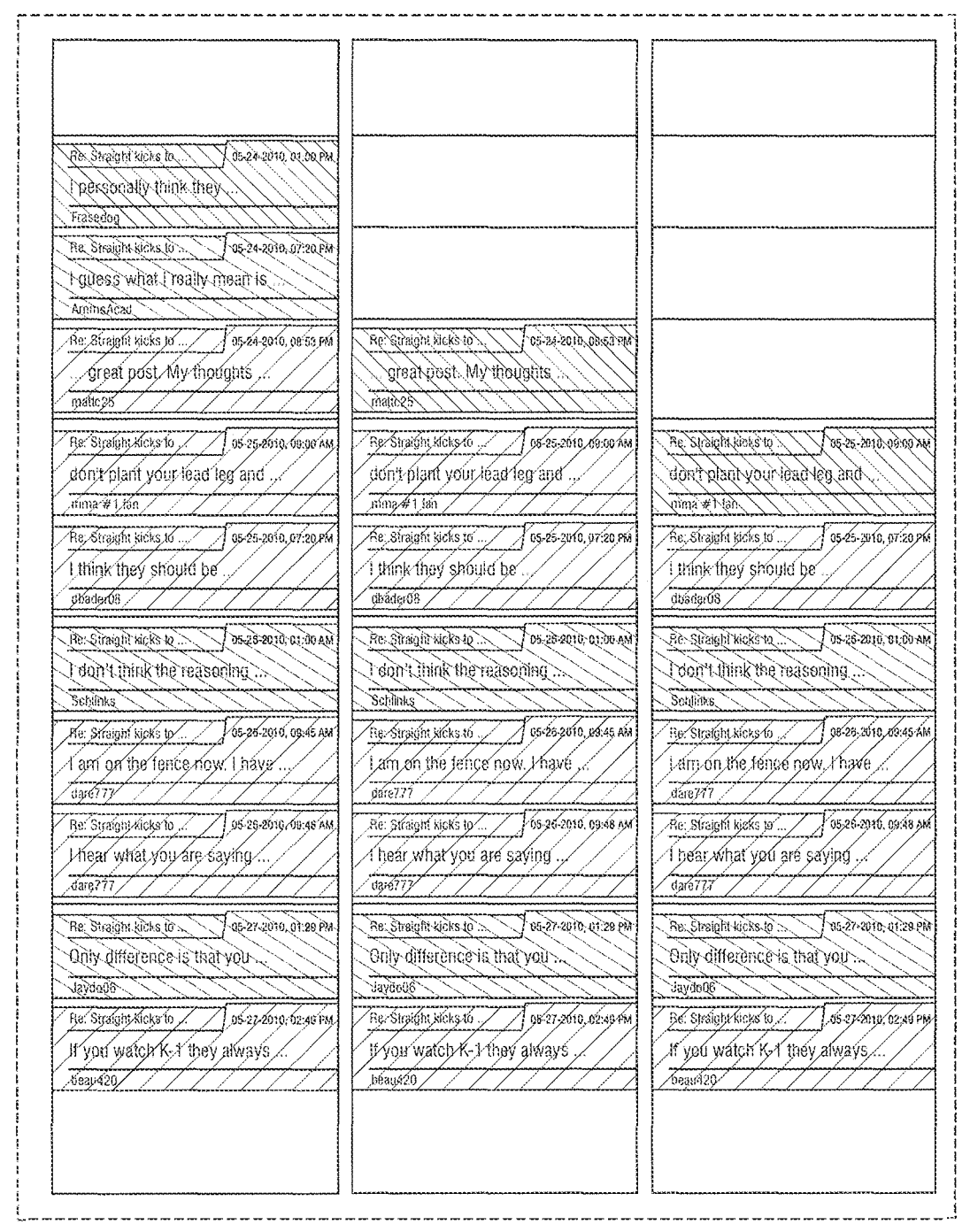
Figure 1J:
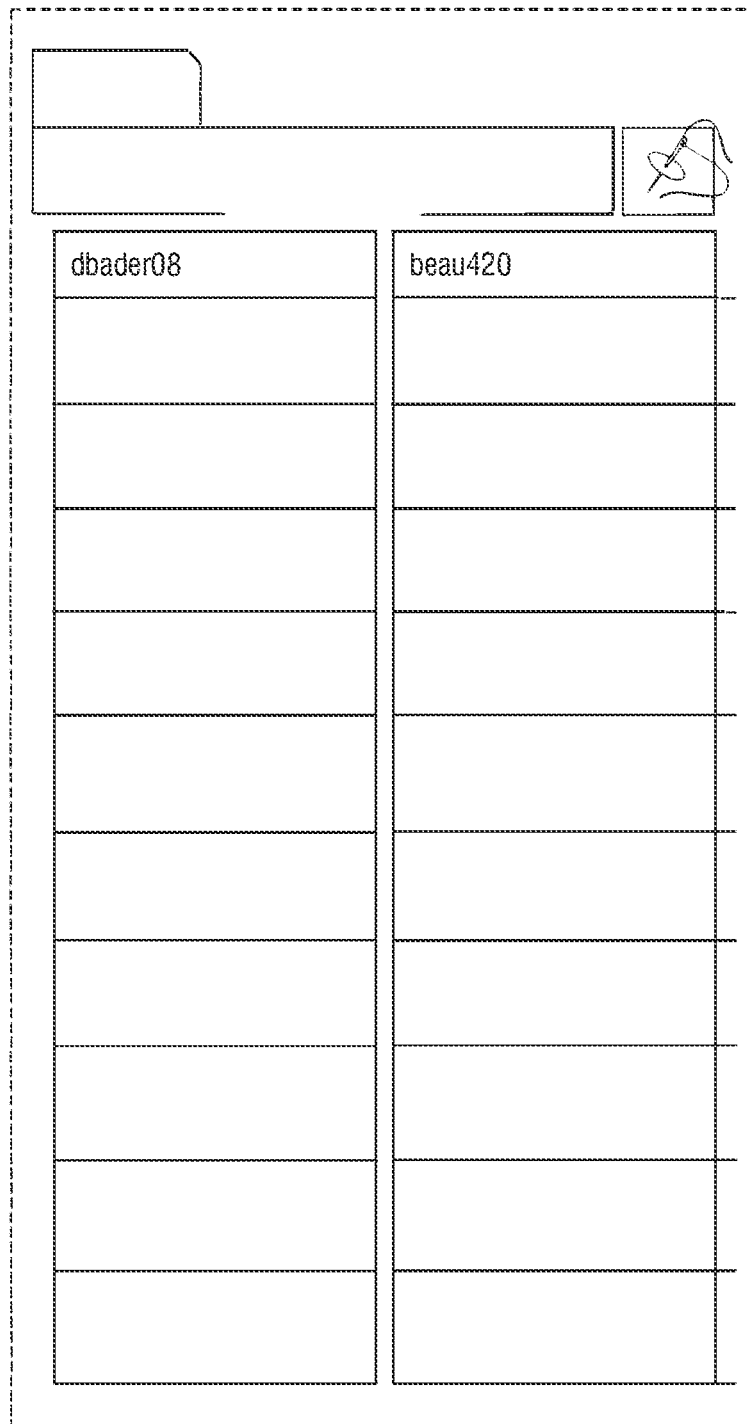
Figure 1K:
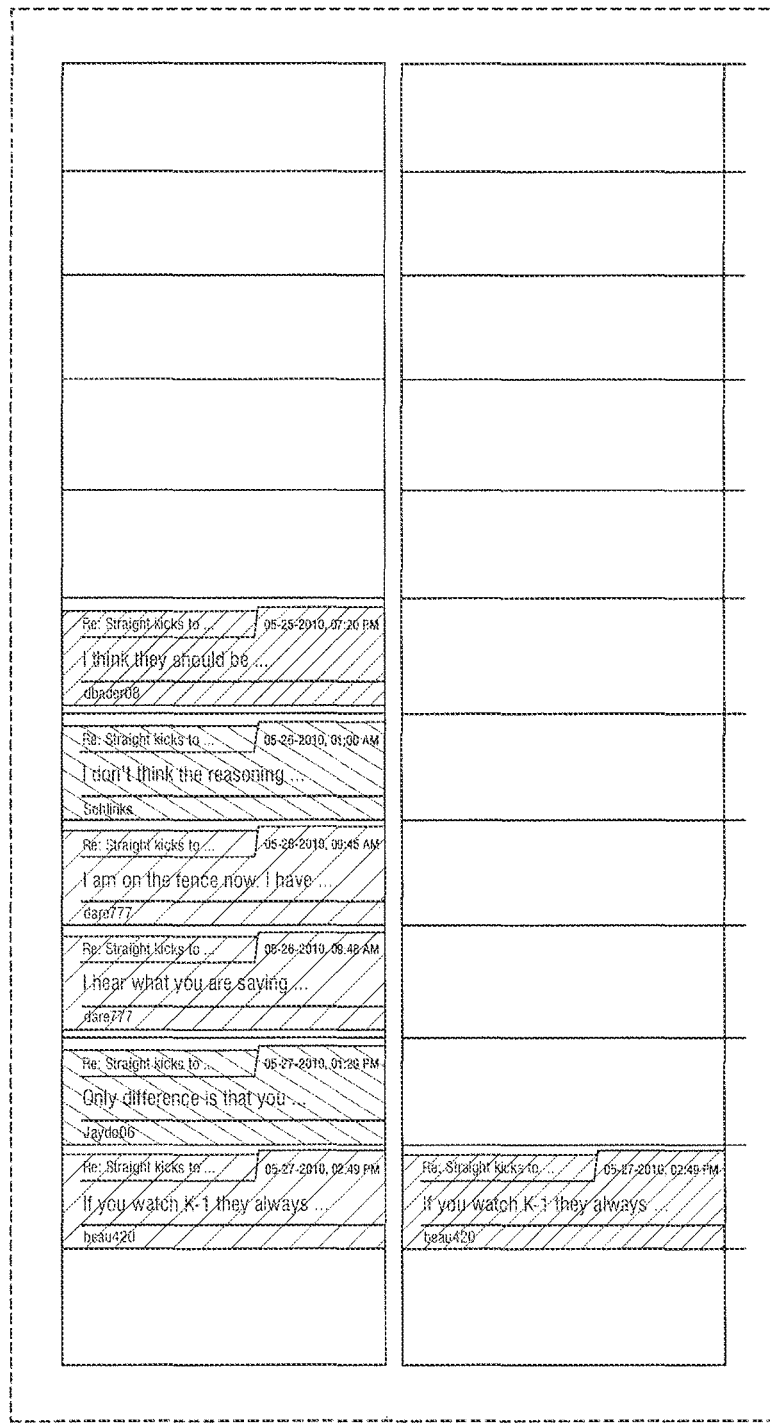

FIG. 1A, including magnified portions of FIG. 1A shown in FIGS. 1B-1K, are an example of a sorted presentation of messages from a linear BBS. The system can sort the messages of the linear BBS according to certain parameters related to the messages and/or their senders. One parameter is the behaviour of the sender of a message. For example, the system can do the following:

The pull-down and right-click menus work together to allow an analyst to focus on the Participants' behavior, and to selectively rank and order the Participant columns. For example, the user may:

- group posters that are frequently online concurrently and closely monitor their behaviour;
- automatically track posters who make a posting that triggers one of the Alert Preferences specified by the analyst;
- highlight posters that frequently make long postings, because they may be trying to radicalize or recruit readers or other posters;
- highlight posters that frequently post short messages, because those may be very specific operational instructions;
- highlight postings containing Alert triggers (Keywords, Sentiment, Locations, Currencies, etc.) that may be out of context for the bulletin board group (e.g., why is the poster talking about Somali currency or Mogadishu in the middle of a bulletin board focused on UFC mixed-martial arts fights?)

After sorting, the system uses color coding to identify types of messages and their relation to other messages. In one embodiment, there are six levels of coding as shown in the legend on FIG. 1A, including magnified portion of FIG. 1A shown in FIG. 1H. It should be understood that the color coding is present for purposes of example only. The system may be implemented with different colors, with shading, with no color, or any other manner if indicating differences between messages.

A key participant 101 is identified by dark red. Copies 102 of postings of a key participant are identified by light red. Postings 103 by non-key participants are identified by dark blue. Copies 104 of postings by a non-key participant are identified by light blue. Postings 105 by participants that also contain an alert are identified by dark orange, and copies 106 of postings of a key participant that contain an alert are identified by light orange. This color coding is given by way of example only and may be changed by the analyst as desired. In addition, the system can be set so that the poster of any message that triggers an alert is defined automatically as a key participant.

Message 107 is an example of a posting (message) of a key participant. In this case, a poster identified as Jaydo06 has been identified as a key participant. In the example shown, all of Jaydo06's postings are in the same column. Copies of each of Jaydo06's postings are shown as copies in a row and appear in each column that has postings at the time of or earlier than the respective Jaydo06 posting. This convention is true for all other posting by key participants or non-key participants; copies of each of a key participant or non-key participant's posting appear in each participant column where the participant has made a posting at the time of or earlier than the respective posting. This shows the relative time relationship between postings of other key participants and non-key participants. In one embodiment, if one posting quotes another or contains similar words, the system links the postings by using identifying iconography. When a non-Key Participant is designated as a Key Participant, the system pivots on the search; i.e. if system is set to find other postings and/or users using phrasing that ties back to a Key Participant, then system will pivot on the search.

In the example of FIG. 1A, including magnified portions of FIG. 1A shown in FIGS. 1B-1E, four key participants (Jaydo06, AmmsAcad, Schlinks, joeyP) are shown in dark red and each have their own column that begins with their first posting that is made at some point in time.

The system includes a number of tools to aid in use and navigation of the display of messages. The top of the display of FIG. 1A, including magnified portions of FIG. 1A shown in FIGS. 1D, 1F, 1H, include a number of tabs such as "sort by", "track users", "view", and "alert preferences". The system also provides tools such as mouse-over and right-click to provide additional features, views and identifiers. The trident tool shown at the left of FIG. 1A also provides a way to navigate to through the messages.

Figure 2:
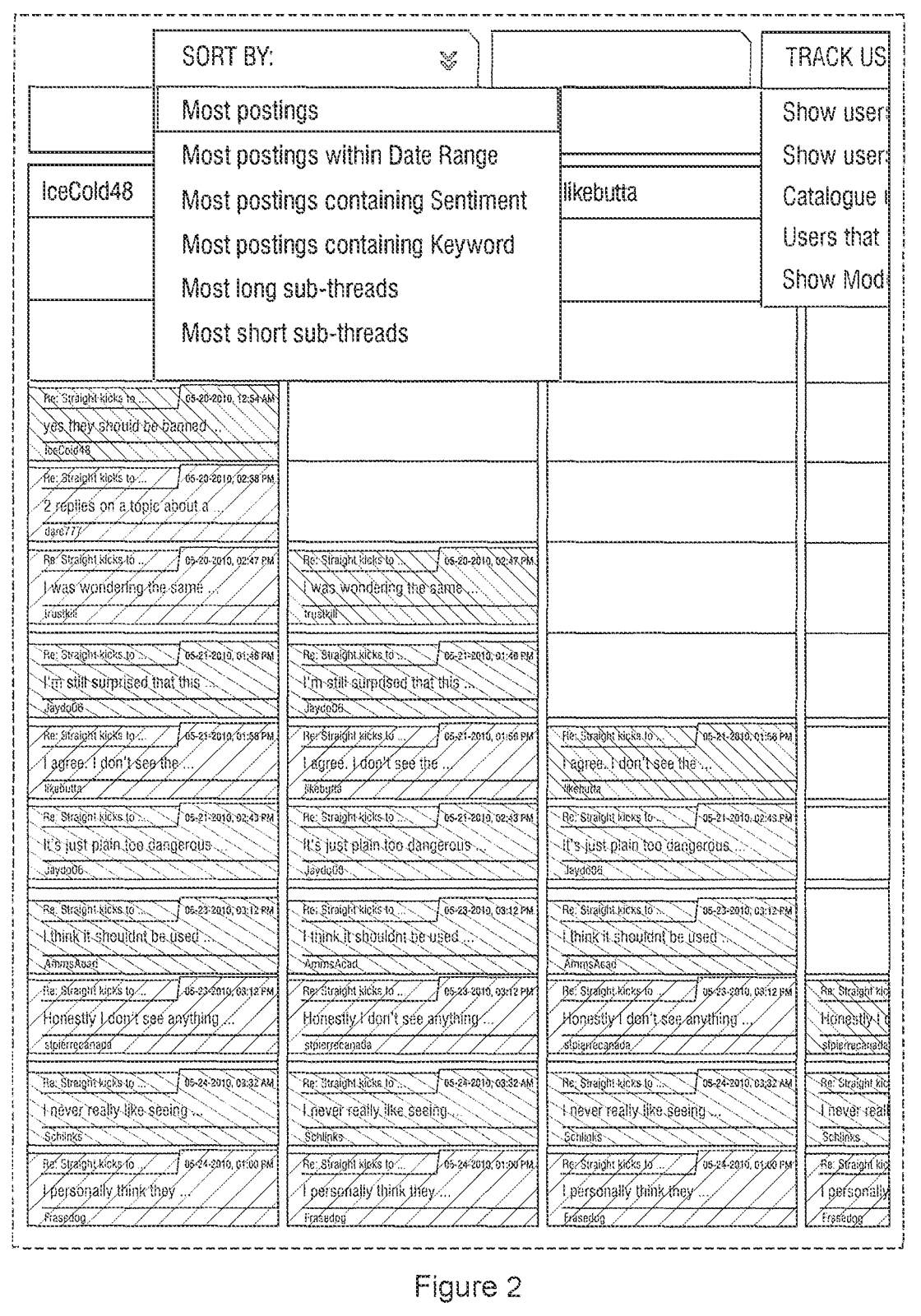

The Sort By tab shown in FIG. 2 allows the user to sort the messages using a number of qualifiers, including most postings, most postings by date range, most postings containing Sentiment, most postings containing a Keyword, most long sub-threads, and most short sub-threads. For intelligence applications, these sorting tools can be useful in identifying patterns that may represent activity of interest.

Figure 3:
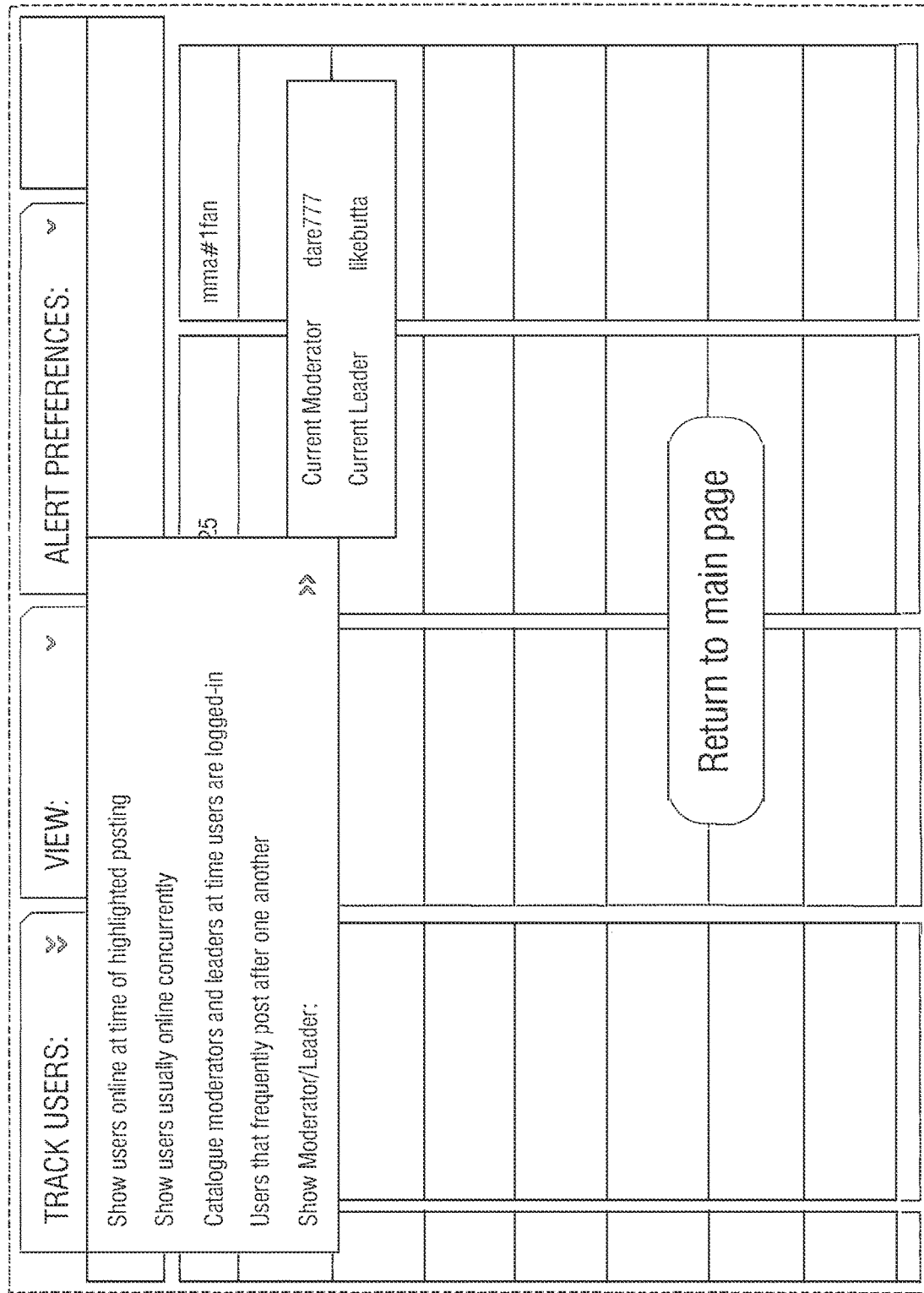
FIG. 3 is an example of the track users feature of an embodiment of the system.

The Track Users tab shown in FIG. 3 allows different posters to be displayed or removed to aid in the analysis of the BBS. This tab allows the user to show posters (whether active or inactive) online at the time of a highlighted posting, to show posters usually online concurrently, to catalogue moderators and leaders at the time particular posters are logged in, to show posters that frequently post after one another, and show moderator leader.

Figure 4:
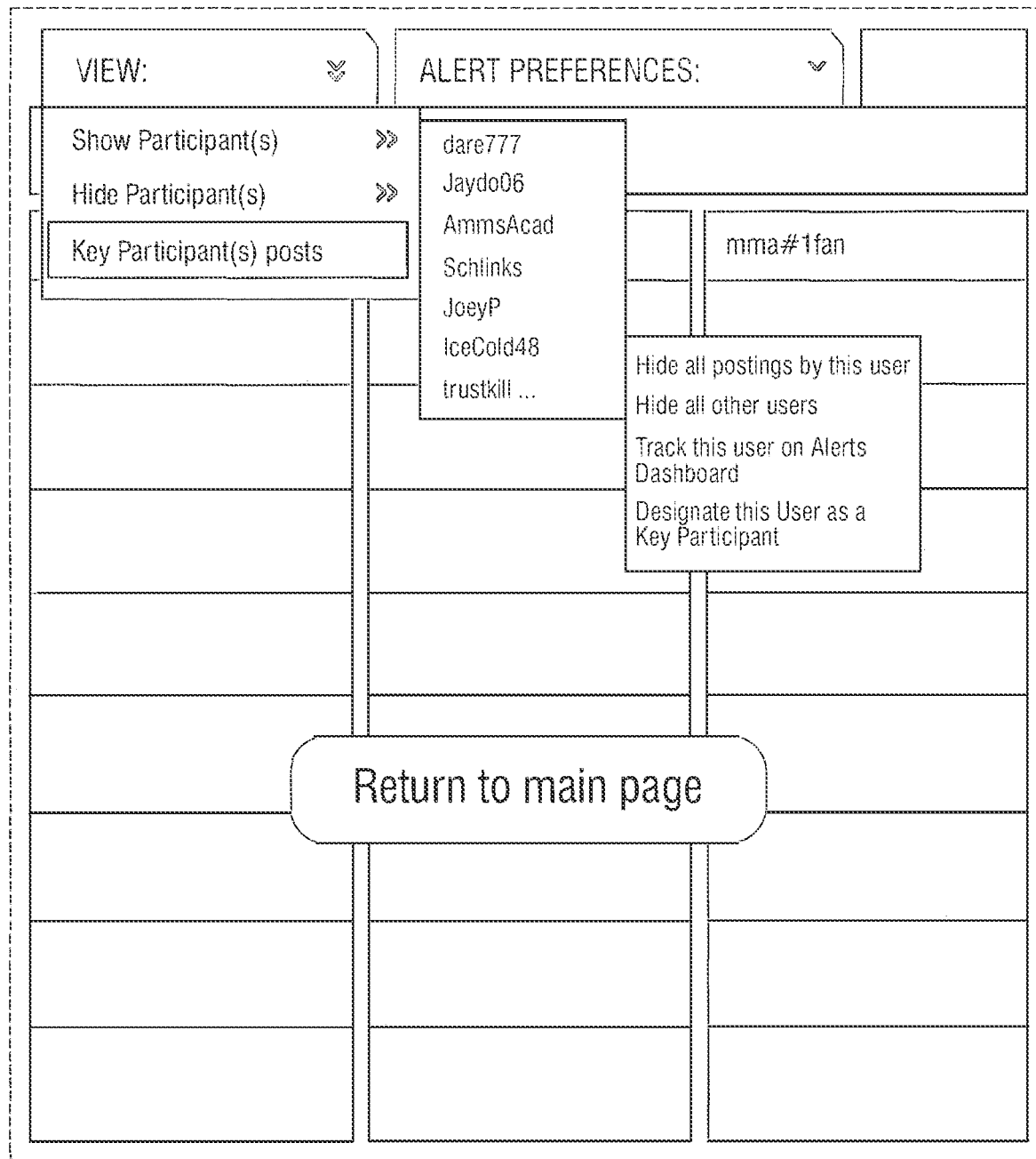
FIG. 4 is an example of the view feature of an embodiment of the system.

The View tab shown in FIG. 4 allows the user to show or hide certain participants. The tab includes choices for show participants, hide participants, and key participants posts. When the user selects any of these choices, the menu expands to show a list of users that are eligible for the desired action. When the user then mouses over to this menu and selects a poster, the system presents another expanded menu for options for this particular poster, such as hide all postings by this poster, hide all other posters, track this poster on Alerts, designate (or undesignated) this poster as a Key Participant.

The Alert Preferences tab shown in FIG. 5 allows the user to set parameters to search for in postings (regardless of whether the poster is a key participant or not). The system may allow for a default identification of a participant as a key participant if an alert trigger is found, but this is optional. The system allows alerts to be defined for currency, geographic location, sentiment, or other terms using an advanced search query. The system may also send an alert whenever specific posters are online.

Figure 6:
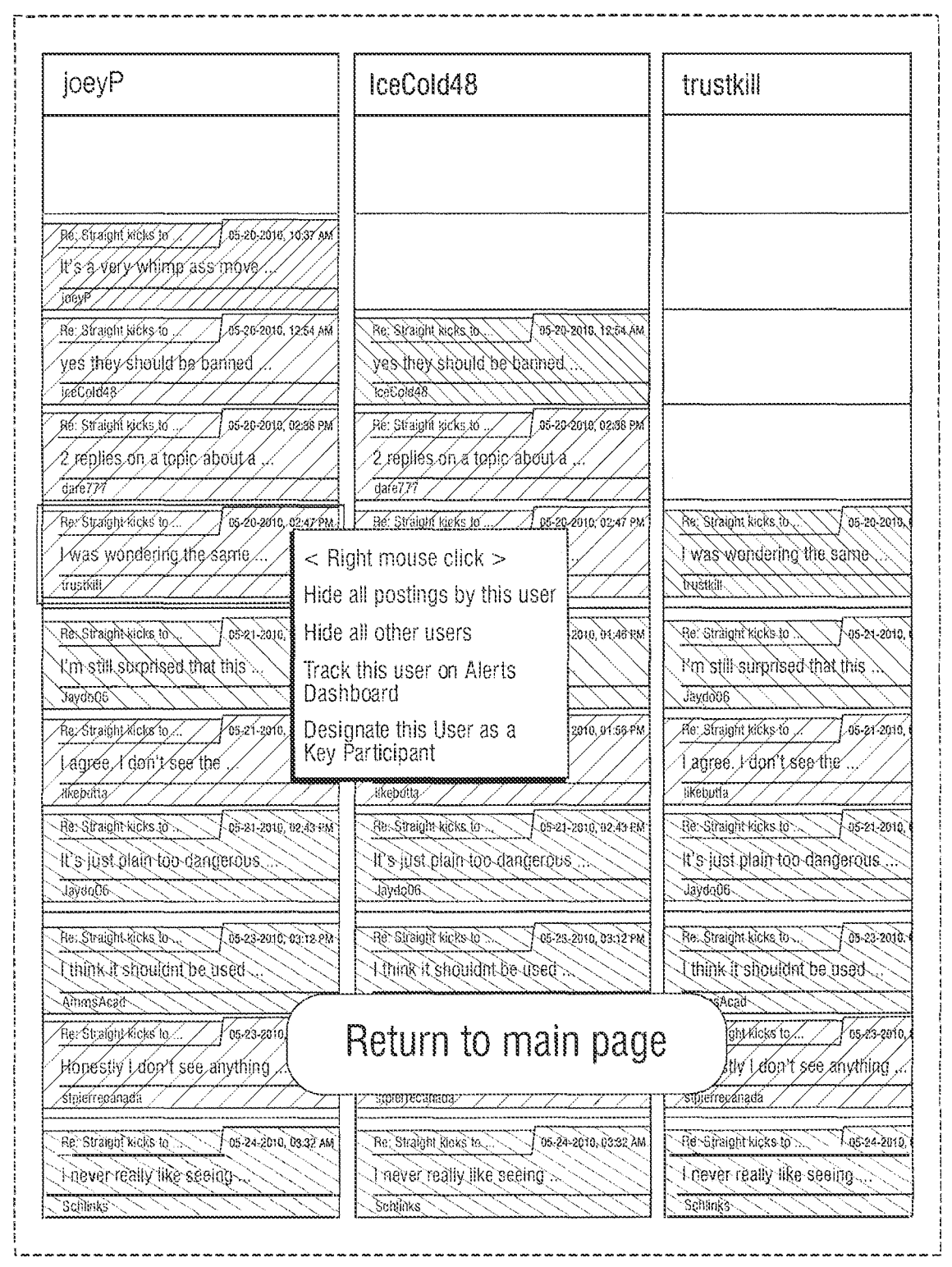

FIG. 6 shows an example of options provided by right-clicking on a message. The system provides a menu that allows options to be taken for the poster associated with this message, such as hide all postings by the poster, hide all other posters, track the poster on Alerts, or designate (or un-designate) the poster as a Key Participant.

The system also provides mouse-over capabilities such as to trigger a popup that shows the full message of a particular message. This allows browsing of the messages without opening up the message separately.

Figure 7:
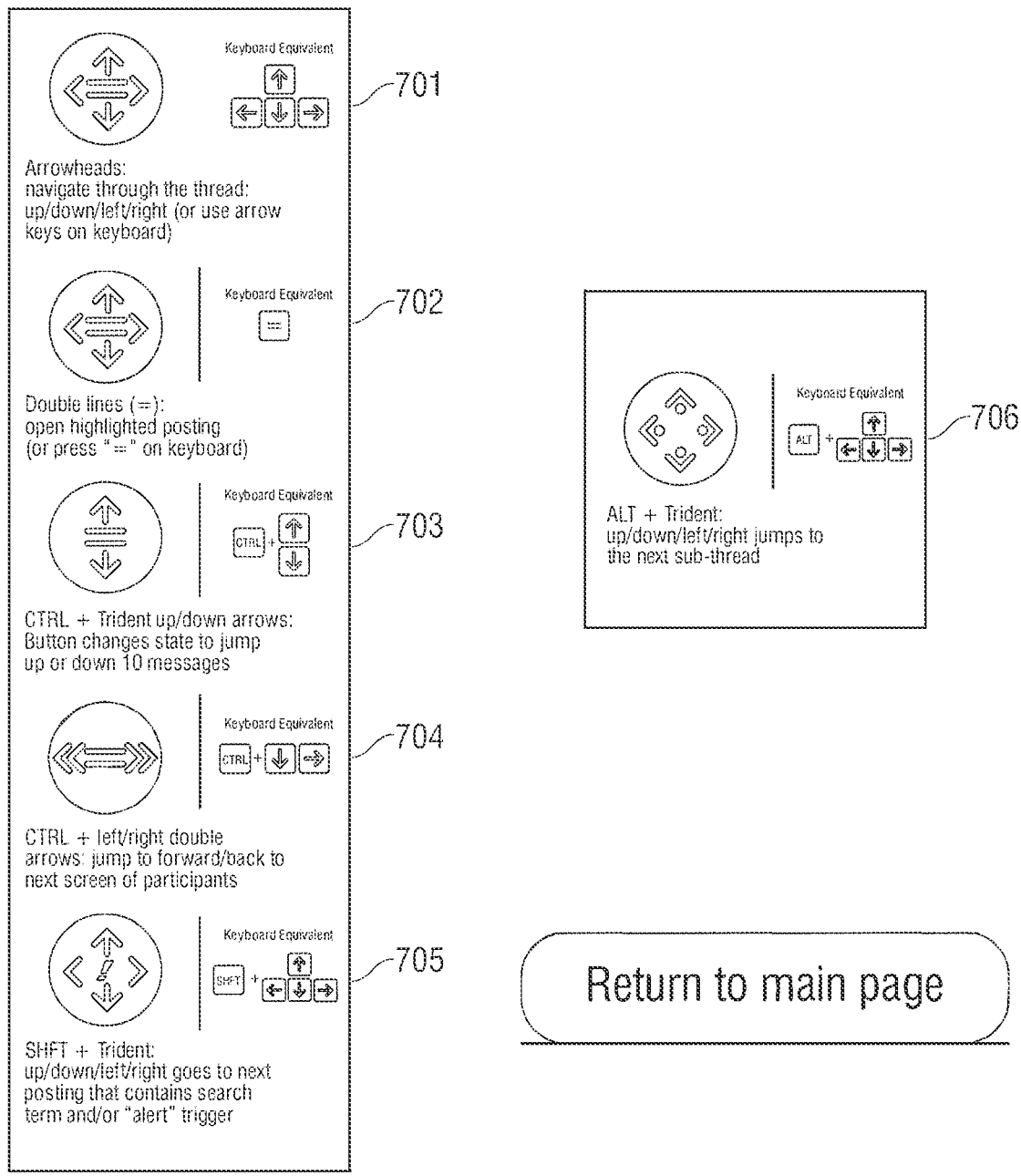
FIG. 7 is an example of the navigation options of the trident tool.

FIG. 7 shows the navigation options of the trident tool. The arrowheads on the navigation tool allow movement through threads up/down and left/right. The =symbol will open an highlighted posting. Using control plus the key allows the user to jump up or down ten messages at a time. Control plus left/right allows the user to jump forward or back to the next screen of participants. The shift plus trident can jump from posting to posting that contains a search term and/or a trigger. Alt+Trident allows the user to jump to the next sub-thread, where sub-threads exist in the original bulletin board thread.

The navigation tool in one embodiment typically appears as at 701 and 702. The tool has four directional arrows (up, down, left, right) which can be accessed by clicking on the tool or by using the arrow keys on the keyboard. Clicking on one of the directional arrows will move the user one message where the step depends on where the user is accessing the tool.

Clicking on the equal sign, or using the equal sign on the keyboard, will toggle the expansion or contraction of a thread or message, depending on where the navigation tool is accessed. When a message or thread is highlighted, the keyboard is active for the navigation tool in the highlighted object, By clicking the Ctrl button on the keyboard, the navigation tool appears as at 703. In this case, the up and down arrows show a number that represents how many steps in the chain each click of an arrow will advance. A click will move the user ten messages up or down for example. The left and right arrows at 704 when the Ctrl button is pressed will move the user to another screen if the display cannot show the entire BBS at once.

Clicking on the shift key causes the navigation tool to appear as at 705. This mode ties into, for example, a search operation. The user can define a term or terms, and each click of the directional arrows will move the user to the next message that satisfies the search criteria.

Alt clicking causes the navigation tool to appear as at 706. This allows the user to move through threads and sub-threads of messages.

Threaded BBS

FIG. 8 is an example of a BBS that has threads and sub-threads. The highest level threads are shown at the furthest left in the outline presentation. Sub-threads, and sub-sub-threads are shown with one or more indentations. The structural nature of threaded BBS's allows a different manner of presentation. It should be noted that a threaded BBS can also be presented in the same manner as a linear BBS as desired. One of the differences between a linear and a threaded BBS is that the threaded BBS will include additional metadata showing the connected messages in a thread and the nature of the relationship (e.g. reply, forward, etc.).

Figure 9A:
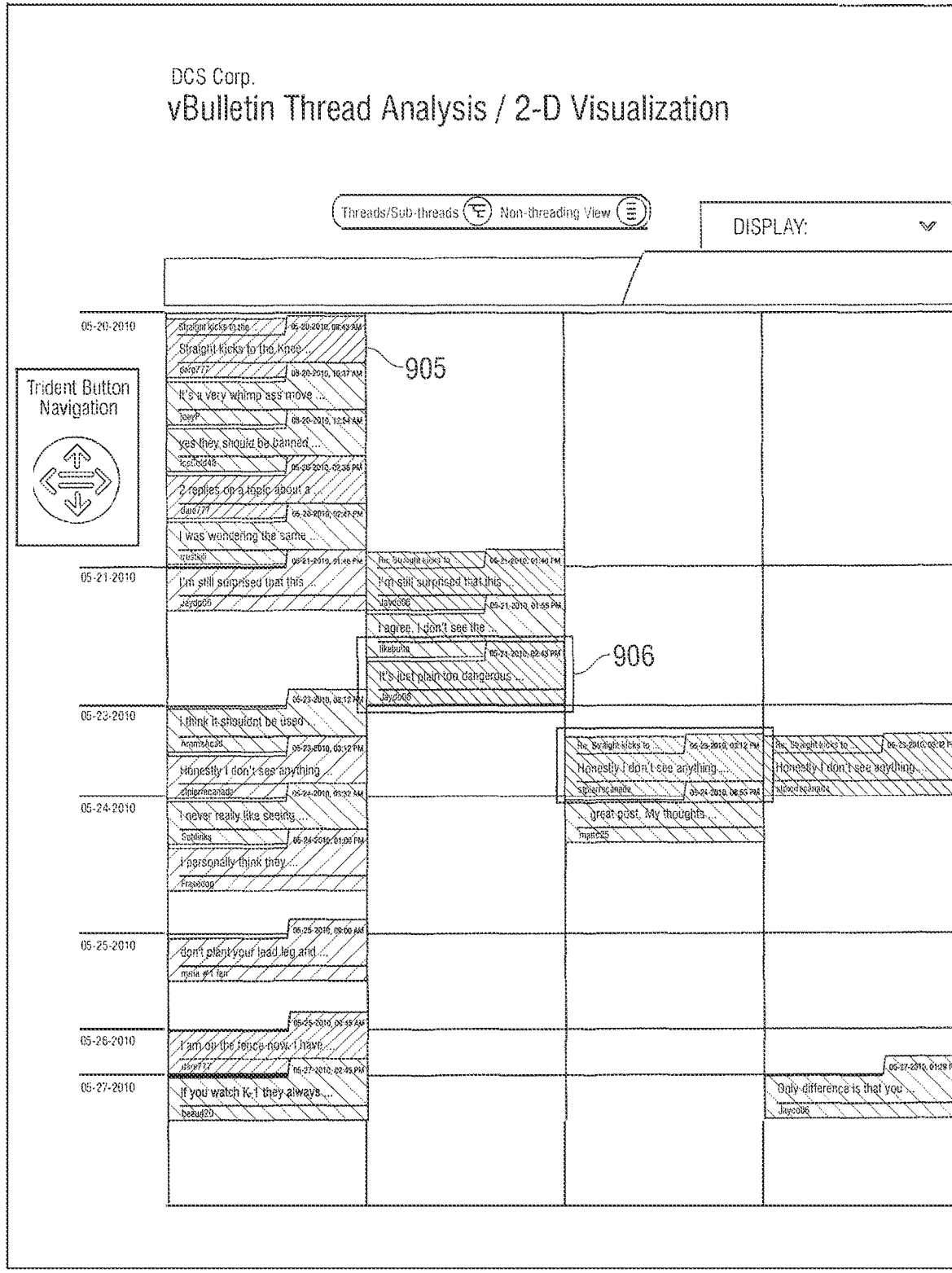
FIGS. 9A-9B illustrate a 2D visualization of a threaded bulletin board.
Figure 9B:
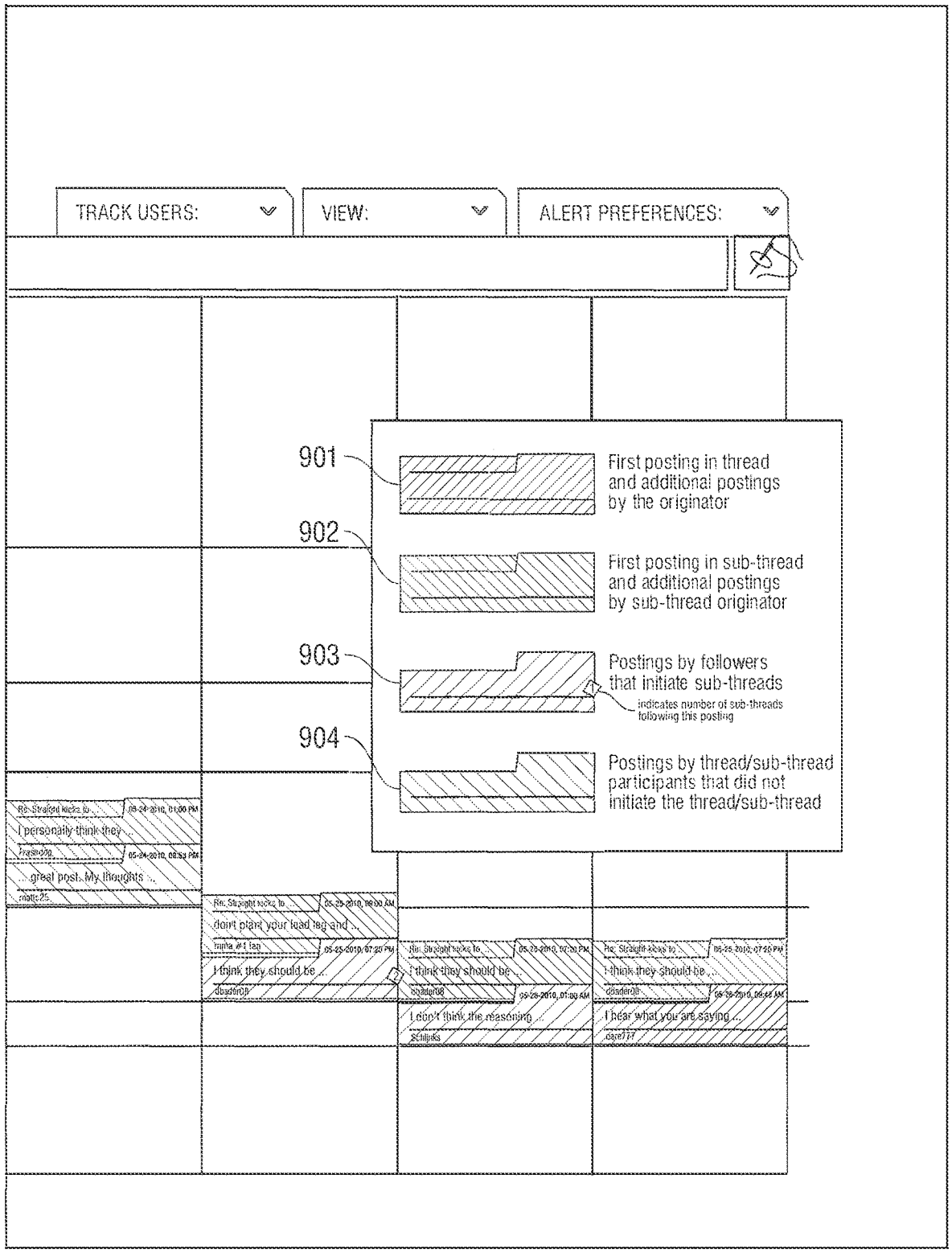

FIGS. 9A-9B are a view of presentation of a threaded BBS after a user defined sort has been applied. In this embodiment, colors 901, 902, 903, and 904 are used to indicate status of certain messages. Red 901 represents the first posting in a thread and additional postings (e.g. post 905) by the original poster (OP). Blue 902 represents the first posting in a sub-thread and additional postings (e.g. post 906) by the sub-thread originator. Light blue 903 represents posters by followers that initiate sub-threads. Orange 904 represents postings by thread/sub-thread participants that did not initiate the thread or sub-thread.

The tabs at the top of the display and the trident navigation tool operate in a similar manner as described above with respect to the linear presentation system. Alt+Trident allows the user to jump to the next sub-thread, if the sub-threads exist in the original bulletin board thread. This feature is particularly useful if the user has chosen to represent a thread with sub-threading using the linear mode of the application, so that they can take advantage of the various Sort By and other features of the linear mode. Shifting a thread with sub-threading to the linear mode allows the user to navigate the linear representation of the thread as though the sub-threading was still present.

Figure 10A:
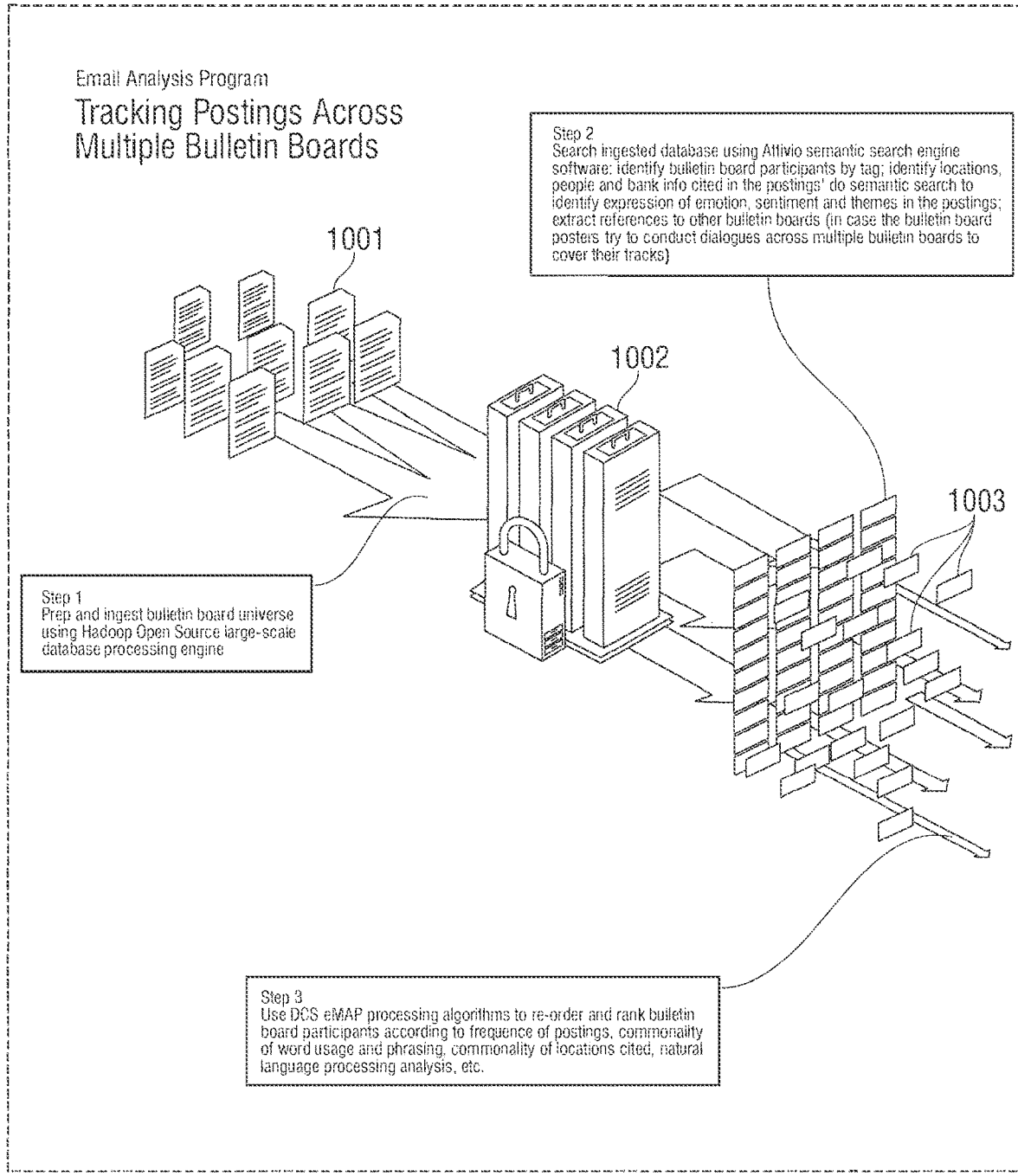
FIGS. 10A-10B illustrate an example of tracking across multiple BBS's in an embodiment of the system.
Figure 10B:
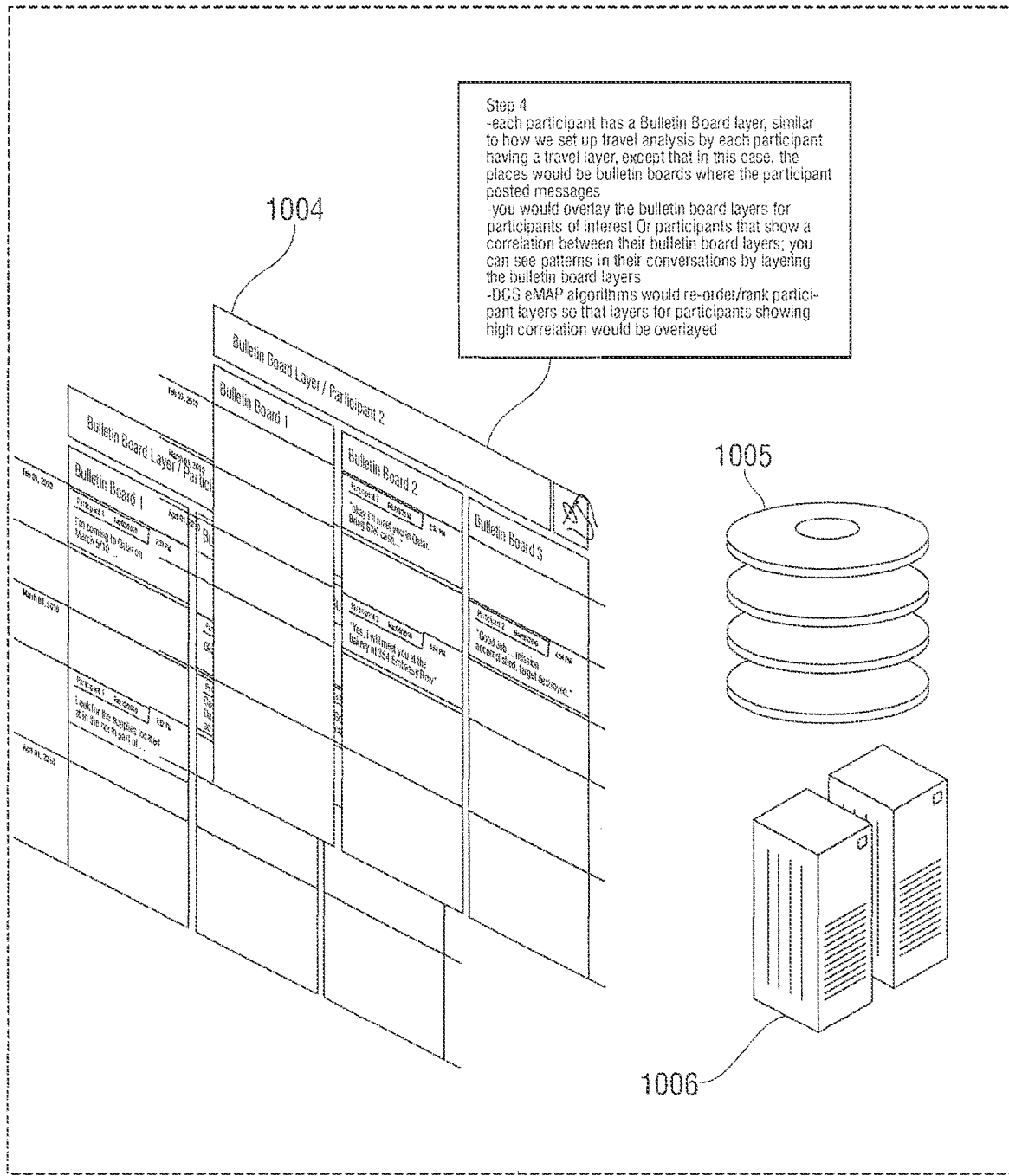

FIGS. 10A-10B illustrate an example of tracking across multiple BBS's in an embodiment of the system. Data from a plurality 1001 of BBS's is provided to server/processor 1002. The data is analyzed using, for example, Attivio semantic search engine, to identify messages of interest and to add meta-tags to the data as appropriate. Searches can be performed to pullout data of interest 1003. This data is then present visually 1004 and information can be stored in database 1005 and servers 1006.

The system is not limited to BBS's but can present the relationship between multiple types of communications including emails, instant messages, texts, tweets, wikis, blogs, voice conversations such as phone calls, postings on social networks such as Facebook, My Space, etc. and other types of communications. In addition, the system allows for the inclusion of transactional information, including financial transactions, physical movement, asset deployment, or other acts or activities that may be related to, or independent of, the communications.

An embodiment of the invention may be implemented in any type of computer system or programming or processing environment, such as tablet PC, iPad, touchscreen device, PDA, smart phones, etc. and will have the corresponding navigational features and tools of those devices.

Communications from each of these sources may be processed as a batch, or in a continuous manner as data arrives from each source, such as live monitoring of communications. Communications may also arrive multiple times or out-of-order, as they are placed in order and de-duplicated by the system.

Tag Clouds/Search Bar Interaction

In one embodiment of the system, data presentation can be via a tag cloud. Tag clouds are a way of visually representing the frequency of terms, words, concepts, or objects in a document or database. There are several different formats for tag clouds, but one format that can be used effectively in this system is the tag cloud format where the most common terms, words, concepts, or objects appear in the center, and then the levels of frequency decrease in concentric circles as you go outwards away from the center.

Instead of just gradating the different terms, words or objects in the tag clouds according to frequency, the user may apply different criteria to the tag cloud visualization, such that terms or words may appear larger or smaller according to certain user-specified boosting criteria. For example, nouns or locations could be set to appear larger than adjectives. Additionally, using proximity analysis, where the user specifies that certain words appearing in the same phrase are more relevant than if they appear in separate phrases, a boosting co-efficient can be assigned to certain phrases or word groupings.

In one embodiment of the system, when the user is viewing a threadlist screen containing a list of communication threads in the database or search results, the user has the option of showing a tag cloud in a message view window, instead of the default view which shows the text of the selected message/posting in the message view window. In one embodiment, when the user clicks on a thread header for a communication thread listed in the thread listing screen, a tag cloud representing the entire thread is shown in the message view window. When the user mouse-clicks or otherwise selects a message in the thread, the tag cloud is shown for the selected message, The user can also set "Maximum detail" option selected via a pull-down menu, a tag cloud for each message is shown instead of the text or first few lines of text in the message.

The tag cloud lets the user instantly see the relative importance or frequency of the words, terms, or concepts contained in without having to read the emails and attachments. This allows instant recognition of subject matter. By using the tag cloud, the user can understand some of the dominant terms, words or concepts in the cube so the user can start selecting search terms in order to further narrow down the data being displayed. This is particularly helpful when beginning a search over the entire database. In cases of a facet search that has been run on an entire database, there are additional options. One option is for the user to generate a separate tag cloud for each facet type (e.g. company, people, location, etc.). As a user adds or removes facets to the search query, the query becomes more focused and the tag clouds adjust.

Figure 13:
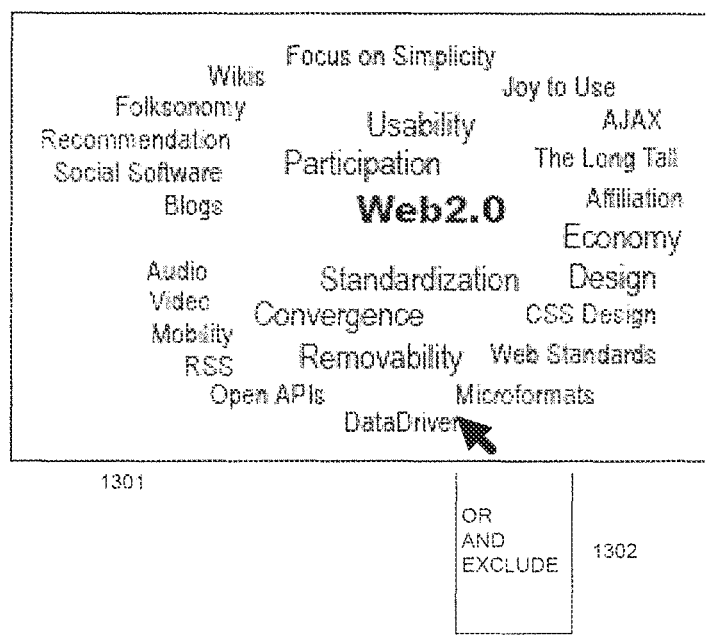
FIG. 13 illustrates the tag cloud action of an embodiment of the system.

FIG. 13 is an illustration of an embodiment of terms in a tag cloud 1301. In one embodiment, the system allows a user to right-click term in tag cloud to cycle through OR/AND/Exclude the selected term in the search bar, so that you OR/AND/Exclude the term from the current search the user is doing. See for example, menu 1302 in FIG. 13 with the options of OR, AND, and EXCLUDE, Alternatively, the user can select OR by clicking the selected term once in the tag cloud, click on the term twice for AND, and click a third time to EXCLUDE the term from the search. When a user has done a search and a tag cloud is presented, this technique allows the user to modify the search and the tag cloud on the fly by using the right click option on any term.

Social Graphs

In one embodiment, the system displays social graphs representing the relationships of users identified in the data or in a search result subset of the data. The system uses the attributes of the participant (not just the number of connections that a participant has) to determine the positioning and the size of the participant's circle in the social graph. The circles in the social graph are sized according to generation, propagation, and execution of an idea/plan: Who comes up with the idea (leader of the terrorist group or the main planner in the terrorist group; "ideas guy" in a circle of friends who thinks of a great idea for a party that everybody loves), who are the "do-ers" (the guys who buy the paint thinner or fertilizer for the bomb; the guys who buy the beer and cake for the party), the guys who execute the actual dirty work on the ground (the leader of the local terrorist cell, the guys who plant the bomb; the actual DJ at the party and the bouncer at the door).

Figures 14, 15:
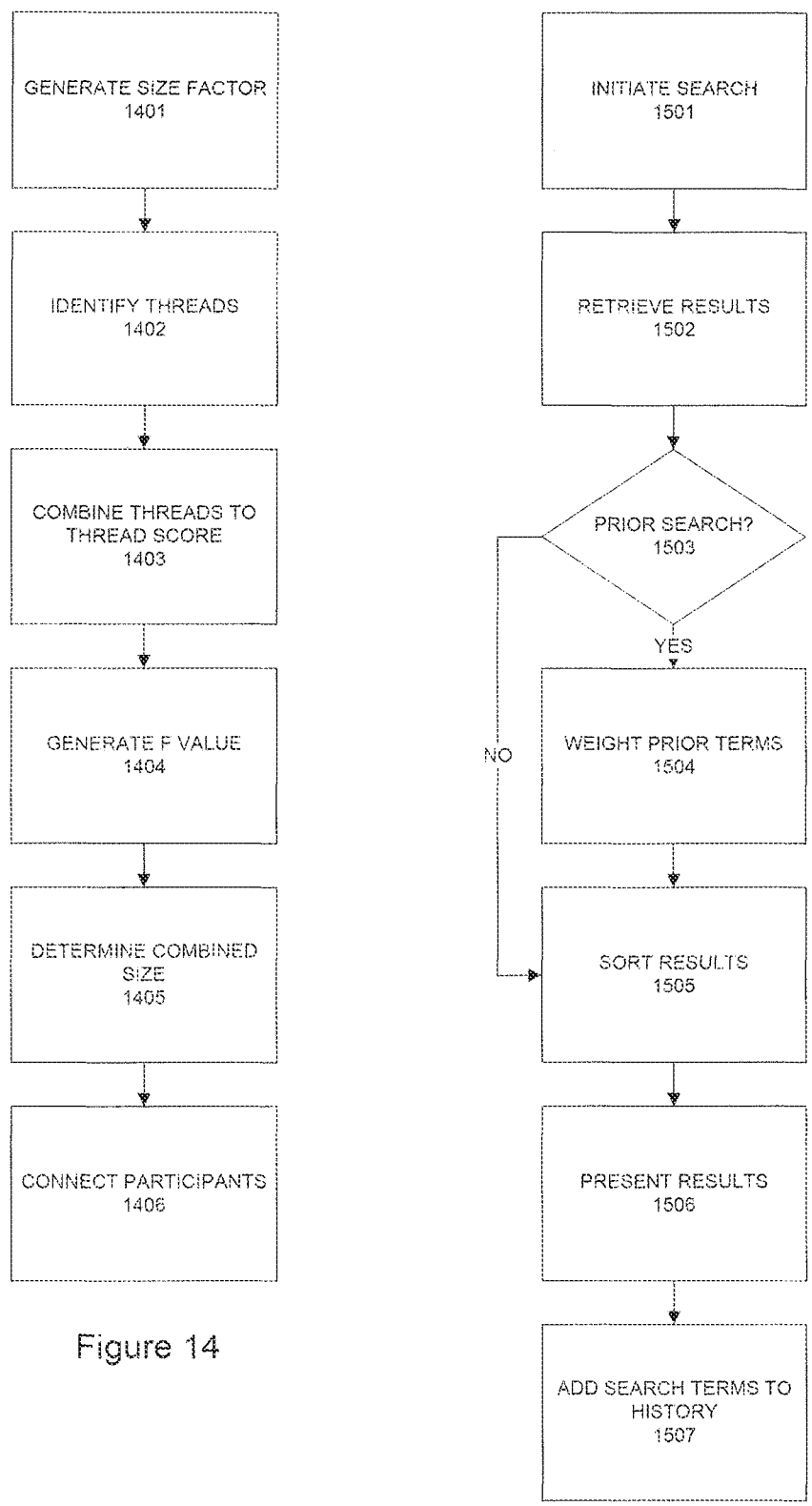
FIG. 14 is a flow diagram illustrating a method of generating a social graph using an embodiment of the system.
FIG. 15 is a flow diagram illustrating an embodiment of adaptive relevancy in searches in the system.

The flow diagram of FIG. 14 illustrates an example of generating a social graph using the system. At step 1401 generates a factor used in determining the size and positioning of the circle for each participant. In this embodiment, the system combines (with various weightings) participant-specific metrics from a metrics list to generate the factor for each participant (e.g. comp_score_participant15 comp_score_participant2 where comp_score_participant1 is defined as a composite score of various metrics such as the number of messages participant! writes that contain a certain user-defined key phrase, the number of messages between participant! and other participants in the social graph between a certain user-defined date range, etc.).

At step 1402, the system identifies the threads where that actual participant is involved. At step 1403, for those threads, the system combines the individual thread-spnumber of messages within the thread that contain a certain user-defined key phrase, threadjtmetric2 is the number of messages in the thread written by participants located in a certain geographical location, etc.) into a composite score for each thread in which the participant is involved in (comp_score_thread 1, coinp_score_thxead2, etc.).

At step 1404 the system applies a weighting/combining function F which operates on the participant-based metrics for each participant (comp_score_participant1s etc.) and the thread-specific metrics for the threads 1 through N where the participant is involved (comp_score_thread1, . . . , comp_score_tbreadN) where function F for participant X is defined as:

F((compj3corejparticipantX), (comp_score_thread1), . . . ? (comp_score_threadN))

At step 1405 the system uses the value of F for each participant to determine the size of the circle for that participant. At step 1406 the system connect all the participants with lines between participants that have connections, putting the biggest circles in the middle of the various clusters in the social graph.

Figure 16:
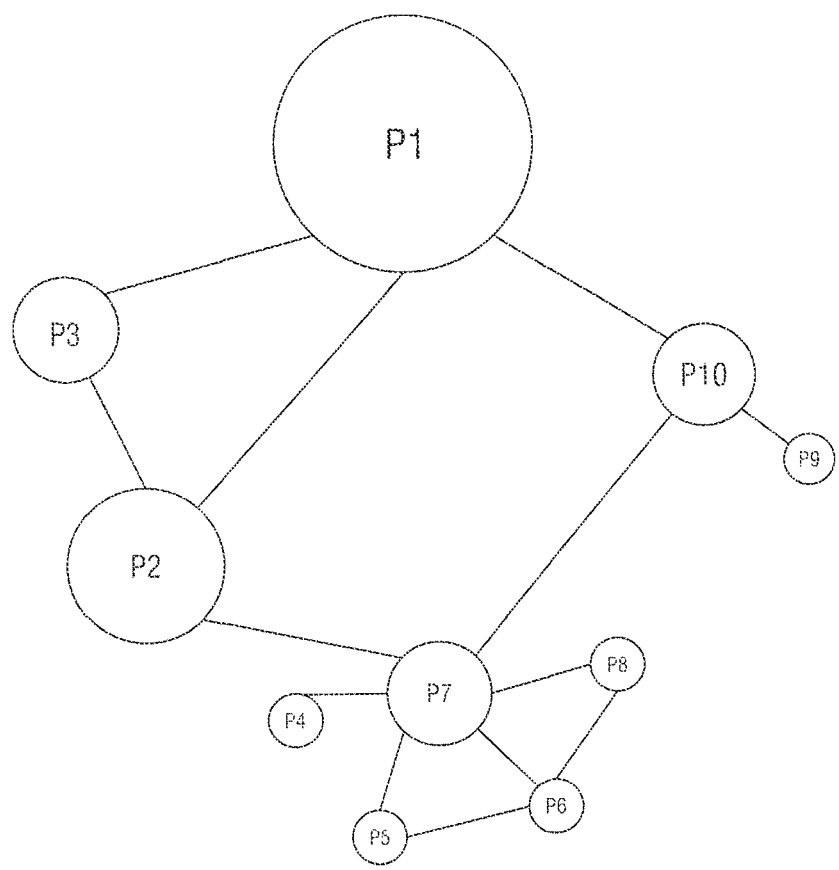
FIG. 16 is an example of a social graph.

FIG. 16 is an example of a social graph that may be used in this embodiment of the system. Each circle represents a user (e.g, P1 to P10). The size of the circle representing each participant represents both number of connections and attributes of the participant. In the example illustrated, even though participant P7 has more connections, participant PI has a larger circle due to the contribution of the attributes of participant PI.

Adaptive Relevancy

The system in one embodiment employs a technique referred to herein as "adaptive relevancy" to aid in fine tuning search results based on a constrained and bounded snapshot of the user's history and activity.

Currently, search engines compute which document is the most relevant for a given user query string. Relevancy is usually defined by a number of metrics and mathematical models to provide a score for the document which matches the users query. At that point the search results are returned in order of the highest score first. Over the past few decades there has been considerable research in tuning search engine relevancy. This research has generally yielded some standard approaches.

When talking about search engine relevancy one metric is TF-IDF relevancy. This abbreviation stands for "Term Frequency*Inverse Document Frequency". At a high level, this says; "More common words are less important when computing relevancy". For example, consider a query containing two terms; "the search". In the English language the word "the" is one of the most common terms that exists. The word "search" is much less common than the word "the". So when computing a relevancy score for this query, the importance of the word "the" is less than the importance of the word "search". "TP" (term frequency) is how many times the relevant term shows up in a found document. "IDF" is the logarithm of how many documents in the entire corpus contain that word.

One problem with TF/IDF relevancy scoring is that documents that contain more content tend to get a better score because there is more text. One approach to offset this effect is to have a field length normalization factor in which the goal is to give shorter documents an equal playing ground to their longer counterparts.

Field or Contextual boosting allows the relevancy to be based on not only which terms matched and how frequently those terms matched in the document, but also says that if the term appears in a field such as the "title" field this is more important than a match in the "text" field. This field boosting is a way of specifying which fields contain better data to match on, and that if a match occurs on a field that is considered important, that the relevancy score should reflect that.

Another search strategy is used, for example, in a news search application. When indexing a news feed there is no external linking that is going on and a page rank model can't be applied. For news applications "freshness" is used as a metric. Freshness is a measure of how old the news article is. The idea is that more recent news is generally what people are looking for and therefore more relevant.

For local search applications, yet another metric for relevancy which is useful is distance to that result. If the documents contain a latitude and longitude value there is the ability to compute how far away that thing is from a point of reference by using the Haversine calculation (also known as the great circle calculation). This is an equation which computes the distance between two points on a curved surface such as a planet.

Another approach that some search engines have employed is referred to as proximity. Proximity only applies to multi term queries. Proximity is an additional boost to a relevancy score that is based on how close to each other the terms the user is searching appear in the text of the document. From the original example query of "the search": documents where the words "the" and "search" appear close to each other are more relevant that documents where the first term occurs on the first page and the second term occurs a hundred pages later. That is, if the terms that a user is searching for occur closer to each other, this is a sign that the document is more related to what the user is looking for.

In one embodiment, the system uses an adaptive relevancy scheme to provide greater precision and relevancy to searches performed on data in the system. In one embodiment, the system computes static rank scores for threads which can be indexed and added to the thread records. A relevancy model can be configured to include the values in this static rank score to help influence the relevancy of the documents that come back. Some basic tuning may be done to make sure that the fields on which the system is boosting the queries exist in the result set and are what are expected. Thus, a match on the message subject is likely more important than the match on the message body, also an exact match on a message's participants should be considered more relevant than just matching the person's name in a chunk of text.

In another embodiment, the system tracks a number of searches over some time period. Those searches are used as boost queries to generate results which are not only related to what the user is currently searching for, but also potentially boost documents which are related to things the user has searched for in the past. This provides a level of adaptive relevancy which is personalized to the user who is currently interacting with the system.

The system tracks a user search history to influence the relevancy of the current search. As a user runs searches, those searches are tracked. Tracking these searches produces a search profile. This search profile provides biases to how the relevancy for a given document in a search result set is computed. This occurs dynamically and creates a custom algorithm for how the search results are returned to each user as they use the system more.

The idea is that a users' previous search history is used to help boost documents that are returned for any given search. If a user searches for "A" in a first search then the user searches for "B" in a second search, the documents that match "B" will be returned, but the documents that also matched "A" will appear higher in the search result set.

If a user now searches in a third query for "C", the documents that match "C" will be returned. Documents that match term "B" will be boosted in the result set more than documents that matched term "A". The older in the users search history the query term is, the less impact it has on the ordering of a users' result set.

The more often a user searches for a term, the more that term will influence the search result and subsequent searches. If a user is researching in a particular area, they may search for many different terms. Each of these different terms will be related to the area of research. The key is to not restrict the result set by searching for all of the terms, but rather to influence how the relevancy is calculated to create a dynamic and adaptive relevancy profile that is tuned for a specific area of research.

The length of history that we can track can be as short or as long, or as specific as desired. The system can track the past 10 searches for a user, or the past 10 million (or more) searches. The system can also track the user's history on a session-by-session basis (each time they log on or off), or on a case-by-case basis (keep track of a user's history for separately for each lawsuit an attorney is working on), Additionally, if the user is working on several cases, store search data for Session 1 involving Case 1, then in Session 2 go to Case 2 and store that data, then in Session 3 go back to Case 1 and recall/embellish data that was stored in Session 1, then in Session 4 go back to case 2 and recall/embellish data that was stored in Session 2

FIG. 15 is a flow diagram that illustrates an embodiment of adaptive relevancy in the system. At step 1501 a search is initiated. At step 1502 the search is performed and results are returned, at step 1503 it is determined if there have been prior searches that can be used for adaptive relevancy. If so, the system proceeds to step 1504 and the search terms from prior searches are weighted according to their temporal relevance or some other metric. That is, search terms from more recent searches are given a higher weight or priority than from older searches. As noted above, the number of prior searches to be used for the adaptive relevancy is variable and may be any number, including cumulative from the entire history of the user, of from a particular session or number of sessions, or may be constrained to an account or associated matter if the user has identified an account for the search.

At step 1505 the search results are sorted. The sorting includes the weighted search terms if prior searches are available at step 1503. If not, the results are sorted based solely on the search terms from step 1501. At step 1506 the results are presented to the user. At step 1507 the search terms are added to the adaptive relevancy history so that they may be used in future searches.

In one embodiment the system stores data for separate files or cases. For example, consider a user working on cases at different times, where each time is considered a session for that case. The system will store data for Case 1, Session 1. At Session 2, the user is working on Case 2, If, at Session 3, the user returns to Case 1, then the system will recall the data from Session 1 because it is associated with Case 1. The system will not accumulate the data from Session 2 because it is associated with Case 2. Similarly, if in a Session 4 the user switches back to Case 2, the system will pull in data from Session 2 and not use the data from Sessions 1 and 3. This embodiment may be enabled or disabled by the user as desired.

In another embodiment, the system would also take into account opposites, such as de-emphasizing messages with a positive sentiment when the session history indicates the user is searching for messages with a negative sentiment. It would also take into account if a previous search in the session is for "NOT apple" (i.e. documents that do not contain "apple"), it would not emphasize documents later in the session that contain "apple" and may, in fact, de-emphasize those documents that contain "apple".

Vector Analysis

In particular embodiments, statistical methods, including vector analysis, may be applied to national language processing of information on the internet to improve relevance of search results through feedback. Vector analysis may be used to analyze concepts within each web page, article, or documents, which may be accessible on the internet, and generate clusters of concepts. In particular embodiments, corpus similarities may be classified by a similarity classifier. Particular concepts may then be applied across other data in databases or large sets of documents, and return the most relevant documents. Particular embodiments gather intelligence and continuously harvest data from the internet, analyzing the data, and delivering it in an organized manner that is ready to use.

In particular example embodiments, web pages, articles, and documents from both structured and unstructured data sources available both externally and internally are analyzed and clusters of concepts, or similarities, for these web pages, articles, and documents are generated. These concepts or similarities are then applied across other data within one or more databases, to analyze, for example 200,000 or more articles and output a list of 10-40 articles that are most relevant to a particular query. Outputs comprise dashboard and alerts, reports, and automatic feeds to customer relationship management ("CRM"), business intelligence ("BI"), and analytics.

Figure 17:
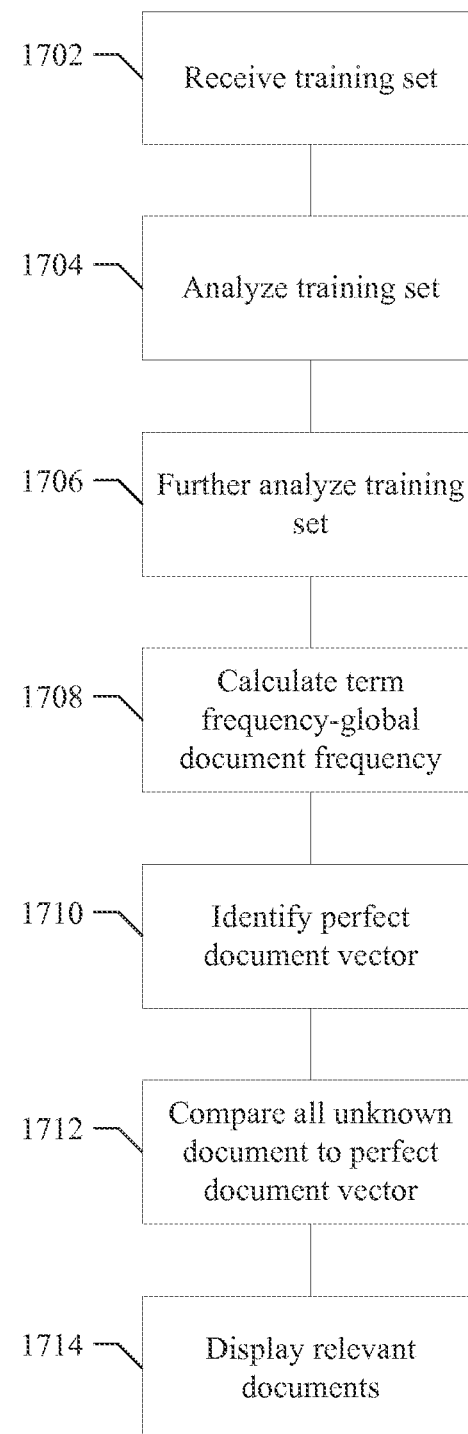
FIG. 17 illustrates an example vector analysis embodiment.

FIG. 17 illustrates an example vector analysis embodiment utilizing a machine learning algorithm to generate a model document that will later be used to compare to one or more unknown documents in order to assign each unknown document a score. That is, quantifiable intelligence about unknown documents may be generated from unstructured information. And that intelligence may be tailored to a specific business need. Typically, a machine learning algorithm is organized into a taxonomy based on the desired outcome of the algorithm. Examples of algorithm types may include supervised learning, unsupervised learning, semi-supervised learning, reinforcement learning, transduction, and learning to learn.

Particular embodiments may repeat the steps of the method of FIG. 17, where appropriate. Moreover, although this disclosure describes and illustrates particular steps of the method of FIG. 17 as occurring in a particular order, the invention contemplates any suitable steps of the method of FIG. 17 occurring in any suitable order.

In any give technical space or conceptual field, there may be a particular corpus of words common to the technical space, conceptual field, or sector. That is, if a given set of words of n-length exist in a predominant share of a particular set of documents, they must be important words in the space. A learning process may be used for a given set of documents to determine the corpus of words common to the technical space or conceptual field. In particular embodiments, n-gram techniques may be used to determine a corpus of words common to the technical space or conceptual field. In particular embodiments, a value may be assigned to each word in the corpus of words as it relates to the particular technical space or conceptual field.

In particular embodiments a first set of curated documents, including a learning set, may be received at step 1702. A learning set of documents may be a particular set of known documents within a given technical space or conceptual field, geographic location, and industry sector, including for example, but not limited to, mergers and acquisitions, financial updates, regulatory changes, legal issues, executive turnover, natural disasters, healthcare, education, schools, including various types of schools, such as public and private universities, public and private elementary, junior high, and high schools, bankruptcy, or Hollywood news. In particular embodiments, a learning set may be as few as 300-400 documents. In particular embodiments, a learning set may have been determined by human classification of a larger set of documents. That is, a learning set may have been determined by manual sorting, tagging for particular conceptual fields, and scoring of a larger set of documents. In particular example embodiments, a simple "yes" and "no" tagging system may be used to determine whether a particular document fits within one or more sectors. In particular embodiments, the larger set of documents may be a 1000 documents or greater and have been randomly selected or not randomly selected. In particular embodiments, the first set of curated document may be updated from time to time by adding more recent documents that have been identified as relevant to a particular technical space or conceptual field. This updating may be done in an ad hoc manner as particular relevant documents are identified.

In step 1704, the curated documents may be analyzed, including examining content of the documents. In particular embodiments, a word count may be performed on the curated documents. A word count may analyze every single word of every single document in the set of curated documents resulting in a list of words of appearing in each document and the count of how many times each word appears in the set of documents. Appendix A illustrates an example word count for the word "budget" throughout the set of curated documents.

In step 1706, the curated documents may be further analyzed, including examining n-grams of words identified in the word count analysis. In particular embodiments, n-grams comprise all combinations of one or more words identified in the word count analysis. In particular embodiments, an n-gram analysis may be performed for all permutations of the words identified in the word count. In particular embodiments, an n-gram analysis may be performed for a subset of all permutations of the words identified in the word count analysis. In particular example embodiments, the n-grams used in the n-gram analysis are a predominant set of words used in a significant percentage of the set of curated documents. In particular embodiments, an n-gram may be a minimum number of words, such as four words. For example, an n-gram may comprise a set of 5 words that appears in a threshold number of documents, such as 20% of the documents. Appendix B illustrates an n-gram analysis for a single n-gram comprising a subset of 5 words, "budget," "cost," "fund," "million," and "tax" from the word count analysis across the curated set of documents. Each value corresponds with a count of whether the n-gram appears in a document from the set of curated documents.

In step 1708, the term frequency-global document frequency ("tf-gdf") scoring is calculated based on n-grams and word counts. In particular embodiments, the tf-gdf is intended to reflect how important a word is to a document within the curated set of documents. Other methods, such as term frequency-inverse document frequency, penalize common words, which does not occur with tf-gdf. Appendix C illustrates an example corpus of words and their corresponding term frequency and global document frequency values based on n-grams and word counts for the set of curated documents.

In step 1710, a perfect document vector is identified based on the averages of the tf-gdf scoring across all of the curated documents. In particular embodiments, a perfect document comprises an ideal set of words for a particular semantic concept, such as a technical space, conceptual field, or sector. In particular embodiments, a perfect document vector comprises a list of terms and a final value that illustrates how valuable the term is across the set of curated documents. Appendix D illustrates an example document vector comprising an example corpus of words and their corresponding average value.

In step 1712, all unknown documents are compared with the perfect document to score the unknown document. In particular embodiments, the tf/gdf values are applied to all unknown documents and mapped onto the vector space. In particular embodiments, the comparison of all unknown documents to the perfect document may be done using cosine similarity. The farther away the unknown documents are from the perfect document, the larger the angle and bigger the value it will have. In particular embodiments, a score is calculated using cosine similarities between one or more unknown documents and the perfect document.

In step 1714, documents that were compared with the perfect document are displayed. In particular embodiments, documents relevant to a particular technical space or conceptual are displayed. In particular example embodiments, a subset of the unknown documents having the highest scores are displayed.

FIG. 18 illustrates an example list of search results that represent the most relevant documents from the set of random documents analyzed. Result 1810 is an example document that is relevant from the set of random documents analyzed against the perfect document vector. Result 1810 has a title 1812, buttons 1814, and data 1816. Result 1820 is another example document that is relevant from the set of random documents analyzed against the perfect document vector. Result 1820 has a title 1822, buttons 1824, and data 1826. Result 1830 is yet another example document that is relevant from the set of random documents analyzed against the perfect document vector. Result 1830 has a title 1832, buttons 1834, and data 1836. Title 1812, 1822, 1832 comprises the title of the document that has been identified as a relevant document. Buttons 1814, 1824, 1834 comprise identifiers where a user may further identify the relevance of the listed document result 1810, 1820, 1830. For example, a user may further categorize as repetitive, opinion, junk, or forward-looking. In particular embodiments, this further categorization may be incorporated into the perfect document vector and further analysis of unknown documents compared with the perfect document vector. Data 1816, 1826, 1836 comprise various document metadata, such as date of publication, type of record, particular tfgdf sector scores (for example, but not limited to, tfgdf_sector_Education_score, tfgdf_sector_MassTransit_score, tfgdf_sector_score_debug), and document title. In particular embodiments, tfgdf_sector_score_debug may analyze other particular sectors, such as education and health and assign a particular score to the result 1810, 1820, 1830.

Figure 19:
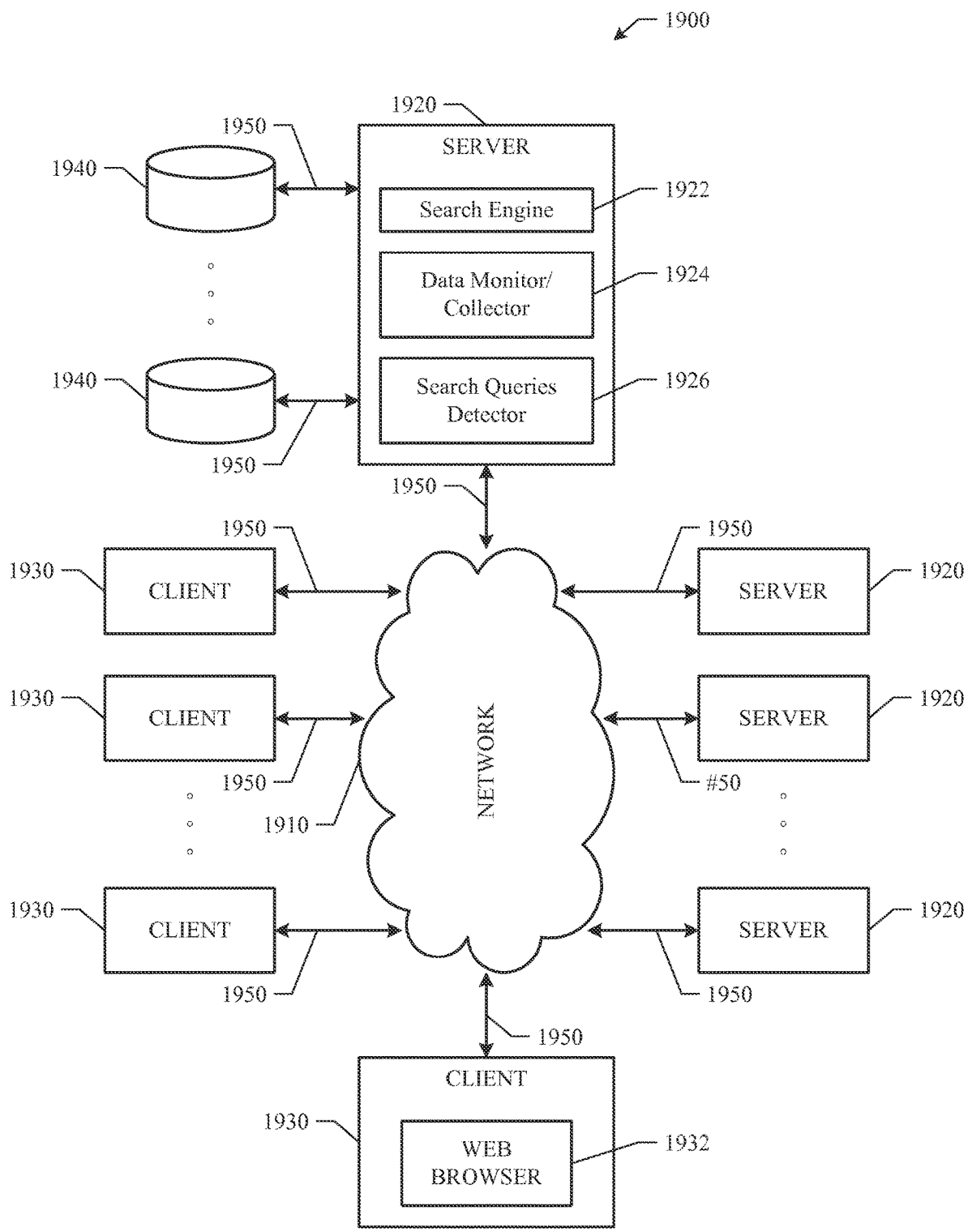
FIG. 19 illustrates an example network environment.

Particular embodiments may be implemented in a network environment. FIG. 19 illustrates an example network environment 1900. Network environment 1900 includes a network 1910 coupling one or more servers 1920 and one or more clients 1930 to each other. In particular embodiments, network 1910 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 1910 or a combination of two or more such networks 1910. The present disclosure contemplates any suitable network 1910.

One or more links 1950 couple servers 1920 or clients 1930 to network 1910. In particular embodiments, one or more links 1950 each includes one or more wired, wireless, or optical links 1950. In particular embodiments, one or more links 1950 each includes an intranet, an extranet, a VPN, a LAN, a WLAN, a WAN, a MAN, a communications network, a satellite network, a portion of the Internet, or another link 1950 or a combination of two or more such links 1950. The present disclosure contemplates links 1950 coupling servers 1920 and clients 1930 to network 1910.

In particular embodiments, each server 1920 may be a unitary server or may be a distributed server spanning multiple computers or multiple datacenters. Servers 1920 may be of various types, such as, for example and without limitation, web server, news server, mail server, message server, advertising server, file server, application server, exchange server, database server, or proxy server. In particular embodiments, each server 1920 may include hardware, software, or embedded logic components or a combination of two or more such components for carrying out the appropriate functionalities implemented or supported by server 1920. For example, a web server is generally capable of hosting websites containing web pages or particular elements of web pages. More specifically, a web server may host HTML files or other file types, or may dynamically create or constitute files upon a request, and communicate them to clients 1930 in response to HTTP or other requests from clients 1930. A mail server is generally capable of providing electronic mail services to various clients 1930. A database server is generally capable of providing an interface for managing data stored in one or more data stores.

In particular embodiments, each client 1930 may be an electronic device including hardware, software, or embedded logic components or a combination of two or more such components and capable of carrying out the appropriate functionalities implemented or supported by client 1930. For example and without limitation, a client 1930 may be a desktop computer system, a notebook computer system, a netbook computer system, a handheld electronic device, or a mobile telephone. A client 1930 may enable a network user at client 1930 to access network 1910. A client 1930 may have a web browser, such as Microsoft Internet Explorer, Mozilla Firefox, or Google Chrome, and may have one or more add-ons, plug-ins, or other extensions, such as Google Toolbar or Yahoo Toolbar. A client 1930 may enable its user to communicate with other users at other clients 1930. The present disclosure contemplates any suitable clients 1930.

In particular embodiments, one or more data storages 1940 may be communicatively linked to one or more servers 1920 via one or more links 1950. In particular embodiments, data storages 1940 may be used to store various types of information. In particular embodiments, the information stored in data storages 1940 may be organized according to specific data structures. Particular embodiments may provide interfaces that enable servers 1920 or clients 1930 to manage (e.g., retrieve, modify, add, or delete) the information stored in data storage 1940.

In particular embodiments, a server 1920 may include a search engine 1922. Search engine 1922 may include hardware, software, or embedded logic components or a combination of two or more such components for carrying out the appropriate functionalities implemented or supported by search engine 1922. For example and without limitation, search engine 1922 may implement one or more search algorithms that may be used to identify relevant documents in response to the search queries received at search engine 1922, one or more ranking algorithms that may be used to rank the identified relevant documents, one or more summarization algorithms that may be used to summarize the identified relevant documents, and so on. The ranking algorithms implemented by search engine 1922 may be trained using the set of the training data.

In particular embodiments, a server 1920 may also include a data monitor/collector 1924. Data monitor/collection 1924 may include hardware, software, or embedded logic components or a combination of two or more such components for carrying out the appropriate functionalities implemented or supported by data collector/collector 1924. For example and without limitation, data monitor/collector 1924 may monitor and collect network traffic data at server 1920 and store the collected network traffic data in one or more data storage 1940. The pairs of search query and clicked URL may then be extracted from the network traffic data.

Figure 20:
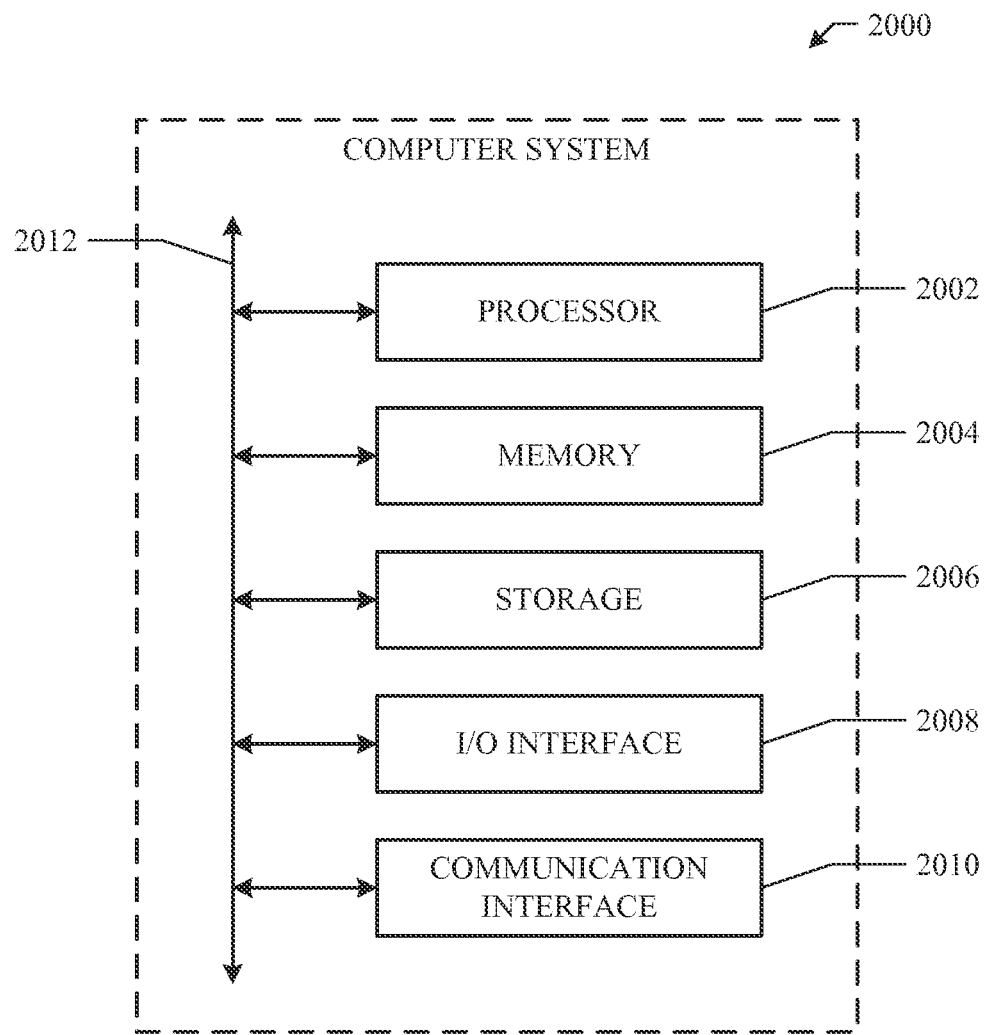
FIG. 20 illustrates an example computer system.

Particular embodiments may be implemented on one or more computer systems. FIG. 20 illustrates an example computer system 2000. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000.

This disclosure contemplates one or more computer systems 2000. This disclosure contemplates computer system 2000 having a physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 2000 may include one or more computer systems 2000; be unitary or distributed; span multiple locations; span multiple machines; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates a computer system having a number of components in particular arrangements.

In particular embodiments, processor 2002 includes hardware for executing instructions, such as those making up a computer program. As an example and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. The present disclosure contemplates processor 2002 including a number of suitable internal caches, where appropriate. As an example and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002. Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. The present disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere). One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Memory 2004 may include one or more memories 2004, where appropriate. Although this disclosure describes and illustrates particular memory, this disclosure contemplates any suitable memory.

In particular embodiments, storage 2006 includes mass storage for data or instructions. As an example and not by way of limitation, storage 2006 may include an HDD, a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both providing one or more interfaces for communication between computer system 2000 and one or more I/O devices. Computer system 2000 may include one or more of these I/O devices, where appropriate. One or more of these I/O devices may enable communication between a person and computer system 2000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it. As an example and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 2002 (such as, for example, one or more internal registers or caches), one or more portions of memory 2004, one or more portions of storage 2006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer system for file analysis, the system comprising:
 a memory comprising instructions executable by one or more processors, wherein the one or more processors are operable to execute the instructions to:
  receive one or more relevant files identified according to one or more semantic concepts;
  identify one or more words in the one or more relevant files;
  count of each of the one or more words for each of the one or more relevant files;
  identify one or more n-grams based on the one or more words identified in the one or more relevant files, wherein an n-gram is one or more combinations of the one or more words;
  produce a plurality of first scores, wherein each first score of the plurality of first scores is based on a term frequency and a global document frequency for each of the one or more words of each of the one or more n-grams of each of the one or more relevant files;
  perform vector analysis on the one or more relevant files to generate a model document used to compare to an unknown file of one or more unknown files in order to assign each unknown files a relevant score;
  produce a document vector based on averages of the plurality of first scores, wherein the document vector comprises a final value that illustrates how valuable the one or more words are in the one or more unknown files;
  compare the unknown file with the model document; and
  assign the relevant score to the unknown file according to the comparison.

2. The computer system of claim 1, wherein the one or more processors are operable to execute the instructions to:
 receive a search query from a user;
 identify one or more files according to the search query; and
 determine the one or more semantic concepts according to the one or more files.

3. The computer system of claim 2, wherein the one or more relevant files comprise the one or more files.

4. The computer system of claim 1, wherein the one or more processors are operable to execute the instructions to:
 compare each of the one or more relevant files to the document vector to determine a second score for each of the one or more relevant files.

5. The computer system of claim 4, wherein the one or more processors are operable to execute the instructions to:
  display to the user, a list of the one or more relevant files having the highest second score that are most relevant to the one or more semantic concepts.

6. The computer system of claim 4, wherein determining the second score for each of the one or more relevant files comprises performing a cosine similarity analysis between each of the one or more relevant files and the document vector.

7. The computer system of claim 1, wherein the one or more processors are operable to execute the instructions to:
  identify a learning set of documents identified as being relevant to the one or more semantic concepts by one or more users.

8. The computer system of claim 1, wherein the one or more semantic concepts comprises at least one of mergers and acquisitions, financial updates, regulatory changes, legal issues, executive turnover, natural disasters, healthcare, education, schools, bankruptcy, and Hollywood news.

9. The computer system of claim 1, wherein the one or more n-grams comprises at least four words of the one or more words.

10. One or more computer-readable non-transitory storage media embodying software that is operable when executed to:
  receive one or more relevant files identified according to one or more semantic concepts;
  identify one or more words in the one or more relevant files;
  count of each of the one or more words for each of the one or more relevant files;
  identify one or more n-grams based on the one or more words identified in the one or more relevant files, wherein an n-gram is one or more combinations of the one or more words;
  produce a plurality of first scores, wherein each first score of the plurality of first scores is based on a term frequency and a global document frequency for each of the one or more words of each of the one or more n-grams of each of the one or more relevant files;
  perform vector analysis on the one or more relevant files to generate a model document used to compare to an unknown file of one or more unknown files in order to assign each unknown files a relevant score;
  produce a document vector based on averages of the plurality of first scores, wherein the document vector comprises a final value that illustrates how valuable the one or more words are in the one or more unknown files;
  compare the unknown file with the model document; and
  assign the relevant score to the unknown file according to the comparison.

11. The media of claim 10, wherein the one or more processors are operable to execute the instructions to:
  receive a search query from a user;
  identify one or more files according to the search query; and
  determine the one or more semantic concepts according to the one or more files.

12. The media of claim 11, wherein the one or more relevant files comprise the one or more files.

13. The media of claim 10, wherein the one or more processors are operable to execute the instructions to:
  compare each of the one or more relevant files to the document vector to determine a second score for each of the one or more relevant files.

14. The media of claim 13, wherein the one or more processors are operable to execute the instructions to:
  display to the user, a list of the one or more relevant files having the highest second score that are most relevant to the one or more semantic concepts.

15. The media of claim 13, wherein determining the second score for each of the one or more relevant files comprises performing a cosine similarity analysis between each of the one or more relevant files and the document vector.

16. The media of claim 10, wherein the one or more processors are operable to execute the instructions to:
  identify a learning set of documents identified as being relevant to the one or more semantic concepts by one or more users.

17. The media of claim 10, wherein the one or more semantic concepts comprises at least one of mergers and acquisitions, financial updates, regulatory changes, legal issues, executive turnover, natural disasters, healthcare, education, schools, bankruptcy, and Hollywood news.

18. The media of claim 10, wherein the one or more n-grams comprises at least four words of the one or more words.

* * * * *